(12) United States Patent
Hirschfeld et al.

(10) Patent No.: US 10,609,442 B2
(45) Date of Patent: Mar. 31, 2020

(54) METHOD AND APPARATUS FOR GENERATING AND ANNOTATING VIRTUAL CLIPS ASSOCIATED WITH A PLAYABLE MEDIA FILE

(71) Applicants: David Hirschfeld, Scottsdale, AZ (US); Mark Phelps, Phoenix, AZ (US); Theodore V. Haig, Phoenix, AZ (US); Barry Fernando, Phoenix, AZ (US)

(72) Inventors: David Hirschfeld, Scottsdale, AZ (US); Mark Phelps, Phoenix, AZ (US); Theodore V. Haig, Phoenix, AZ (US); Barry Fernando, Phoenix, AZ (US)

(73) Assignee: ART RESEARCH AND TECHNOLOGY, L.L.C., Phoenix, AZ (US)

(*) Notice: Subject to any disclaimer, the term of this patent is extended or adjusted under 35 U.S.C. 154(b) by 258 days.

(21) Appl. No.: 15/479,774

(22) Filed: Apr. 5, 2017

(65) Prior Publication Data

US 2018/0027282 A1    Jan. 25, 2018

Related U.S. Application Data

(63) Continuation-in-part of application No. 15/269,879, filed on Sep. 19, 2016, now Pat. No. 10,084,840.
(Continued)

(51) Int. Cl.
*H04N 21/431* (2011.01)
*H04L 12/58* (2006.01)
(Continued)

(52) U.S. Cl.
CPC ....... *H04N 21/4318* (2013.01); *G06F 3/0482* (2013.01); *G06F 3/0484* (2013.01);
(Continued)

(58) Field of Classification Search
CPC ... H04W 4/21; G06F 3/0484; H04N 21/4318; H04N 21/4334
See application file for complete search history.

(56) References Cited

U.S. PATENT DOCUMENTS 6,687,878 B1    2/2004    Eintracht et al.
8,533,598 B2 *  9/2013    Meaney ............... G11B 27/031
                                               715/716
(Continued)

FOREIGN PATENT DOCUMENTS

JP       2009199500 A        9/2009
KR      20100071359 A        6/2010
KR    1020110136308 A       12/2011

*Primary Examiner* — Mohamed A. Wasel
(74) *Attorney, Agent, or Firm* — Quarles & Brady LLP

(57) ABSTRACT

A method and system for annotating playable media files is provided. A virtual clip is associated with first and second locations in the playable media file. The first and second locations together define a clip of the playable media file occurring between the first and second locations. The clip is displayed on a computing device of a user and a first user input associated with the virtual clip is received. The first user input is determined to conform to a predetermined format defining taxonomy tags. One or more taxonomy tags are identified from the user input and the virtual clip is associated, in an account of the user, with each of the one or more taxonomy tags identified from the user input.

13 Claims, 19 Drawing Sheets

Related U.S. Application Data

(60) Provisional application No. 62/364,774, filed on Jul. 20, 2016.

(51) Int. Cl.

| | | |
|---|---|---|
| *H04N 21/845* | (2011.01) | |
| *G06F 3/0482* | (2013.01) | |
| *G06F 3/0484* | (2013.01) | |
| *G11B 27/34* | (2006.01) | |
| *G11B 27/32* | (2006.01) | |
| *H04N 21/433* | (2011.01) | |
| *H04N 21/472* | (2011.01) | |
| *H04N 21/2187* | (2011.01) | |
| *G06Q 50/00* | (2012.01) | |
| *G06F 16/903* | (2019.01) | |
| *H04L 12/46* | (2006.01) | |
| *H04L 29/06* | (2006.01) | |
| *H04W 4/02* | (2018.01) | |
| *H04L 12/18* | (2006.01) | |
| *H04W 4/21* | (2018.01) | |
| *H04L 29/08* | (2006.01) | |

(52) U.S. Cl.
CPC ....... *G06F 16/90335* (2019.01); *G06Q 50/01* (2013.01); *G11B 27/327* (2013.01); *G11B 27/34* (2013.01); *H04L 12/1818* (2013.01); *H04L 12/4625* (2013.01); *H04L 51/16* (2013.01); *H04L 51/32* (2013.01); *H04L 65/602* (2013.01); *H04N 21/2187* (2013.01); *H04N 21/4334* (2013.01); *H04N 21/47205* (2013.01); *H04N 21/8456* (2013.01); *H04W 4/02* (2013.01); *H04W 4/21* (2018.02); *H04L 67/02* (2013.01); *H04L 67/306* (2013.01)

(56) References Cited

U.S. PATENT DOCUMENTS

| | | |
|---|---|---|
| 9,451,001 B2 | 9/2016 | Hirschfeld et al. |
| 9,767,087 B1* | 9/2017 | Petrov .................. H04N 21/437 |
| 9,867,011 B2 | 1/2018 | Kulikov |
| 2009/0248833 A1 | 10/2009 | Frazier |
| 2010/0251386 A1 | 9/2010 | Gilzean et al. |
| 2010/0278504 A1 | 11/2010 | Lyons et al. |
| 2010/0287475 A1* | 11/2010 | van Zwol ........... G06F 3/04817 715/723 |
| 2011/0063317 A1 | 3/2011 | Gharaat et al. |
| 2012/0151320 A1* | 6/2012 | McClements, IV ........................ G06Q 10/101 715/230 |
| 2012/0151346 A1 | 6/2012 | McClements, IV |
| 2012/0159329 A1* | 6/2012 | Chow .................. G11B 27/329 715/716 |
| 2012/0284343 A1 | 11/2012 | Lee et al. |
| 2012/0317210 A1 | 12/2012 | Fisher et al. |
| 2013/0046761 A1 | 2/2013 | Soderberg et al. |
| 2014/0075317 A1 | 3/2014 | Dugan et al. |
| 2014/0172848 A1 | 6/2014 | Koukoumidis et al. |
| 2014/0214966 A1 | 7/2014 | Hirschfeld et al. |
| 2014/0229866 A1 | 8/2014 | Gottlieb |
| 2016/0353245 A1 | 12/2016 | Kulikov |
| 2017/0013042 A1 | 1/2017 | Hirschfeld et al. |

\* cited by examiner

METHOD AND APPARATUS FOR
GENERATING AND ANNOTATING VIRTUAL
CLIPS ASSOCIATED WITH A PLAYABLE
MEDIA FILE

CROSS-REFERENCE TO RELATED
APPLICATIONS

This application claims priority to a U.S. Provisional Patent Application having Ser. No. 62/364,774, filed on Jul. 20, 2016; and is a Continuation-In-Part of U.S. patent application having Ser. No. 15/269,879, filed on Sep. 19, 2016. The disclosure of the above-identified patent documents are incorporated herein by reference in their entirety.

TECHNOLOGY FIELD

Embodiments generally relate to assemblies, methods, devices, and systems for managing information, and more particularly, to assemblies, methods, devices, and systems for sharing and annotating content between members of a social network.

SUMMARY

Embodiments of the current disclosure describe a method for displaying information associated with a playable media file. The method comprises the steps of obtaining stored data describing the information, the stored data comprising a storage location of the playable media file and a plurality of virtual clips each associated with the playable media file and including a first data element identifying a first time within the playable media file at which the corresponding virtual clip begins, and a second data element identifying a first user profile associated with creating the corresponding virtual clip; accessing the playable media file at the storage location; causing a graphical user interface (GUI) to be displayed on a computing device of a user, wherein said GUI enables the user to generate user inputs by interacting with the GUI; receiving a first user input indicating a first interaction of the user with a first display position on the timeline; determining a selected time within the playable media file that corresponds to the first display position; identifying a first virtual clip of the plurality of the virtual clips and one or more of the virtual clips; and updating the user interface on the computing device to display a list of the one or more displayable virtual clips in the second interactable graphical object.

Further, certain embodiments of the current disclosure depict a method for marking a portion of interest in a playable media file. The method comprises the steps of causing a recording device to begin capturing a recording of a live event as the Playable Media File; while the recording device is capturing the recording, receiving a first user input, the recording device continuing to capture the live content subsequent to the first user input; determining from the first user input, a first temporal point of interest during said recording of the Playable Media File; generating a first temporal place marker that indexes said first temporal point of interest; and electronically storing the first temporal place marker.

Moreover, certain embodiments of the current disclosure describe a method of annotating a playable media file. The method comprises the steps of obtaining a virtual clip comprising a first location within the playable media file and a second location within the playable media file, the first and second locations together defining a clip of the playable media file occurring between the first and second locations; causing, using the virtual clip, the clip to be displayed on a computing device of a user; receiving a first user input associated with the virtual clip; determining that the first user input conforms to a predetermined format defining taxonomy tags; identifying one or more taxonomy tags from the user input; and associating, in an account of the user, the virtual clip with each of the one or more taxonomy tags identified from the user input.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as a logical flow-chart diagram (e.g., FIGS. 4-16). As such, the depicted order and labeled steps are indicative of one embodiment of the presented method. In certain embodiments, other steps and methods are conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types are employed in the flow-chart diagrams, they are understood not to limit the scope of the corresponding method (e.g., FIGS. 4-16). Indeed, some arrows or other connectors may be used to indicate only the logical flow of the method. For instance, an arrow indicates a waiting or monitoring period of unspecified duration between enumerated steps of the depicted method. Additionally, the order in which a particular method occurs may or may not strictly adhere to the order of the corresponding steps shown.

In certain embodiments, individual steps recited in FIGS. 4-16, are combined, eliminated, or reordered.

Applicants' system and method includes a network wherein a video can be created using any available video format, and that video can be shared between a plurality of people. In certain embodiments, Applicants' system and method can be used by multiple members of a social network to associate annotations with a Playable Media File including a composite digital clip, and/or to initiate discussion threads associated with that Playable Media File including a composite digital clip.

Figure 1:
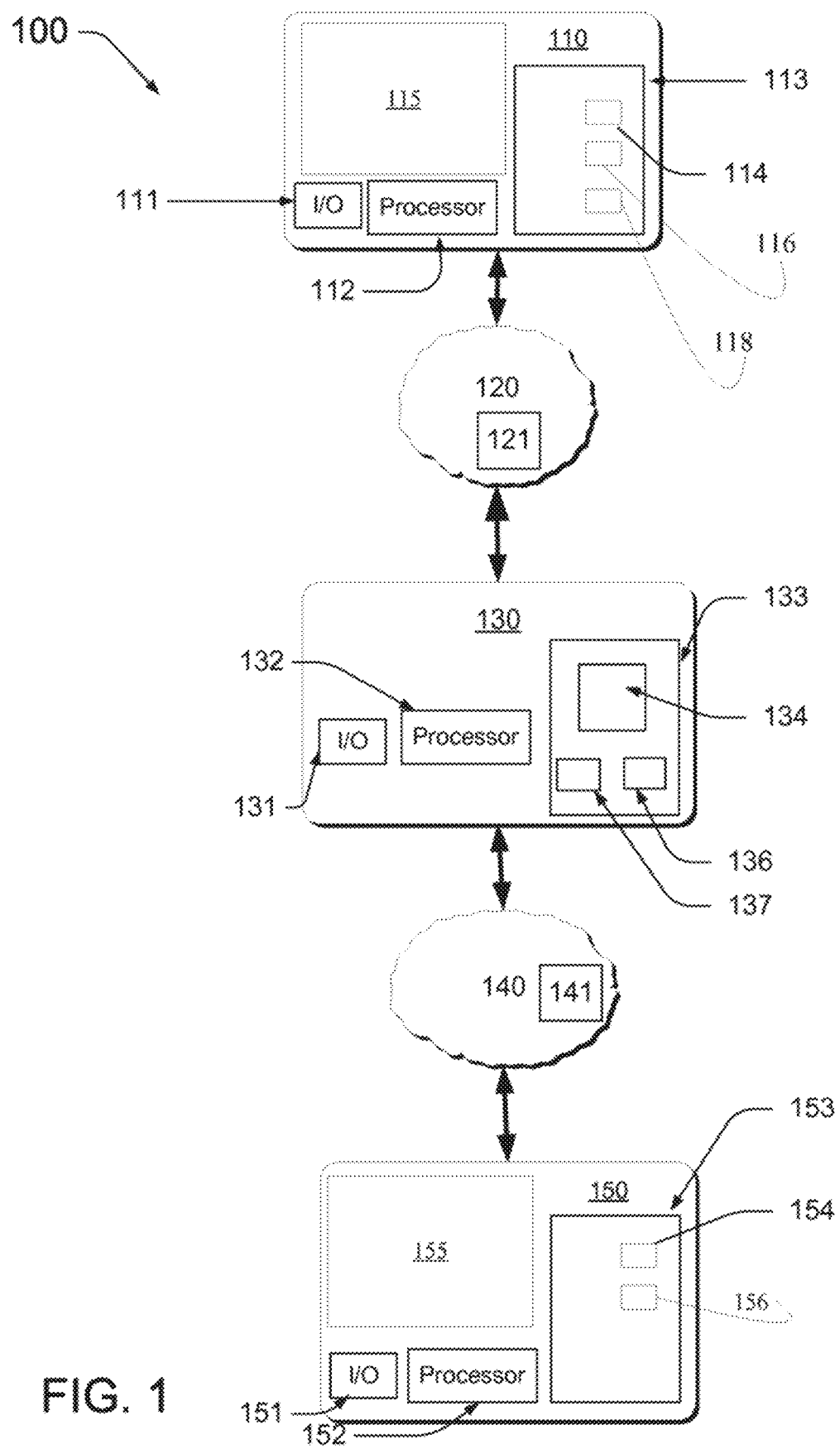
FIG. 1 illustrates an exemplary embodiment of a system for making a composite video with annotation(s)

Referring to FIG. 1, a portion of Applicants' network 100 is illustrated. In certain embodiments, Applicants' network 100 comprises a social network. In certain embodiments, Applicants' social network 100 is an open social network. In certain embodiments, Applicants' social network 100 is a closed social network.

In the illustrated embodiment of FIG. 1, network 100 comprises a network server 130 that is communicatively connected to a computing device 110 through a first communication fabric 120 and a computing device 150 through a second communication fabric 140. In certain embodiments, the network server 130 is owned and/or operated by a social networking service provider while computing devices 110 and 150 are owned and/or operated by users or members of the social network 100, where a member has a profile containing information about the member stored in information 137 of the social network server 130. In some embodiments, the computing device 110 is owned and operated by a first member and the computing device 150 is owned and operated by a second member.

For the sake of clarity, FIG. 1 shows a first computing device 110, network server 130, and a second computing device 150. FIG. 1 should not be taken as limiting. Rather, in other embodiments any number of entities and corresponding devices can be part of the network 100, and further, although FIG. 1 shows two communication fabrics 120 and 140, in other embodiments, less than, or more than, two communication fabrics are provided in the social network 100. For example, in certain embodiments, the communication fabric 120 and the communication fabric 140 are the same communication fabric.

In certain embodiments, the computing devices 110 and 150 and host 130 are each an article of manufacture. Examples of the article of manufacture include: a server, a mainframe computer, a mobile telephone, a smart telephone, a personal digital assistant, a personal computer, a laptop, a set-top box, an MP3 player, an email enabled device, a tablet computer, a web enabled device, or other special purpose computer each having one or more processors (e.g., a Central Processing Unit, a Graphical Processing Unit, or a microprocessor) that are configured to execute Applicants' API to receive information fields, transmit information fields, store information fields, or perform methods.

By way of illustration and not limitation, FIG. 1 illustrates the computing device 110, the network server 130, and the computing device 150 as each including a processor 112, 132, and 152, respectively, a non-transitory computer readable medium 113, 133, and 153, respectively, having a series of instructions 114, 134, and 154, respectively, encoded therein, an input/output means 111, 131, and 151, respectively, such as a keyboard, a mouse, a stylus, touch screen, a camera, a scanner, or a printer. Computer readable program code 114, 134, and 154 is encoded in non-transitory computer readable media 113, 133, and 153, respectively. Processors 112, 132, and 152 utilize computer readable program code 114, 134, and 154, respectively, to operate computing devices 110, 130, and 150, respectively. In certain embodiments, the computing device 110, 130, and 150 employ hardware and/or software that supports accelerometers, gyroscopes, magnetometers (e.g., solid state compasses) and the like.

Processors 112 and 152 utilize Applicants' Application Program Interfaces (APIs) 116 and 156, respectively, encoded in computer readable media 113 and 153, respectively, to communicate with host 130 and access Applicants' algorithm 136 encoded in computer readable medium 133 to implement Applicants' social network and method described herein. Algorithm 136 comprises Applicants' source code to operate a public or private social network, and when implemented by computing device 110 causes a graphic user interface ("GUI") to be displayed on display screen 115, wherein that GUI comprises and displays a plurality of graphical interactable objects. A member using computing device 110 (or computing device 150) can utilize that GUI to access a logical volume, such as for example and without limitation logical volume 180 (FIG. 2), wherein information specific to that user are encoded in logical volume 180. The member and/or user can further utilize the GUI to access Applicants' social network as described herein.

Processor 132 accesses the computer readable program code 134, encoded on the non-transitory computer readable medium 133, and executes an instruction 136 to electronically communicate with the computing device 110 via the communication fabric 120 or electronically communicate with the computing device 150 via the communication fabric 140. Encoded information 137 includes, for example and without limitation, the data communicated or information fields communicated, e.g., date and time of transmission, frequency of transmission and the like, with any or all of the computing device 110 and the computing device 150. In certain embodiments, information 137 is analyzed and/or mined. In certain embodiments, information 137 is encoded in a plurality of individual logical volumes specific to each member/user.

In certain embodiments, computing devices 110 and 150 further comprise one or more display screens 115 and 155, respectively. In certain embodiments, display screens 115 and 155 comprise an LED display device.

In certain embodiments, the information fields received from the computing device 110 at the network server 130 are exchanged with other computing devices not shown in FIG. 1. For example, information fields received from a social network in which the member has an Internet presence is sent to the social network server 130 and stored at the information 137 in association with a profile of the member. Alternatively, or in combination, the information fields transmitted from the computing device 110 to the social network server 130 is sent to an account of the member within the social network.

In certain embodiments, information 137 is encoded in one or more hard disk drives, tape cartridge libraries, optical disks, combinations thereof, and/or any suitable data storage medium, storing one or more databases, or the components thereof, in a single location or in multiple locations, or as an array such as a Direct Access Storage Device (DASD), redundant array of independent disks (RAID), virtualization device, etc. In certain embodiments, information 137 is structured by a database model, such as a relational model, a hierarchical model, a network model, an entity-relationship model, an object-oriented model, or a combination thereof. For example, in certain embodiments, the information 137 is structured in a relational model that stores a plurality of identities for each of a plurality of members as attributes in a matrix.

In certain embodiments, the computing devices 110, 130, and 150 include wired and/or wireless communication devices which employ various communication protocols including near field (e.g., "Blue Tooth") and/or far field communication capabilities (e.g., satellite communication or communication to cell sites of a cellular network) that support any number of services such as: telephony, Short Message Service (SMS) for text messaging, Multimedia Messaging Service (MMS) for transfer of photographs and videos, electronic mail (email) access, or Global Positioning System (GPS) service, for example.

As illustrated in FIG. 1, the communication fabrics 120 and 140 each comprise one or more switches 121 and 141, respectively. In certain embodiments, communication fabrics 120 and 140 are the same. In certain embodiments, at least one of the communication fabrics 120 and 140 comprises the Internet, an intranet, an extranet, a storage area network (SAN), a wide area network (WAN), a local area network (LAN), a virtual private network, a satellite communications network, an interactive television network, or any combination of the foregoing. In certain embodiments, at least one of the communication fabrics 120 and 140 contains either or both wired or wireless connections for the transmission of signals including electrical connections, magnetic connections, or a combination thereof. Examples of these types of connections include: radio frequency connections, optical connections, telephone links, a Digital Subscriber Line, or a cable link. Moreover, communication fabrics 120 and 140 utilize any of a variety of communication protocols, such as Transmission Control Protocol/Internet Protocol (TCP/IP), for example.

Figure 2:
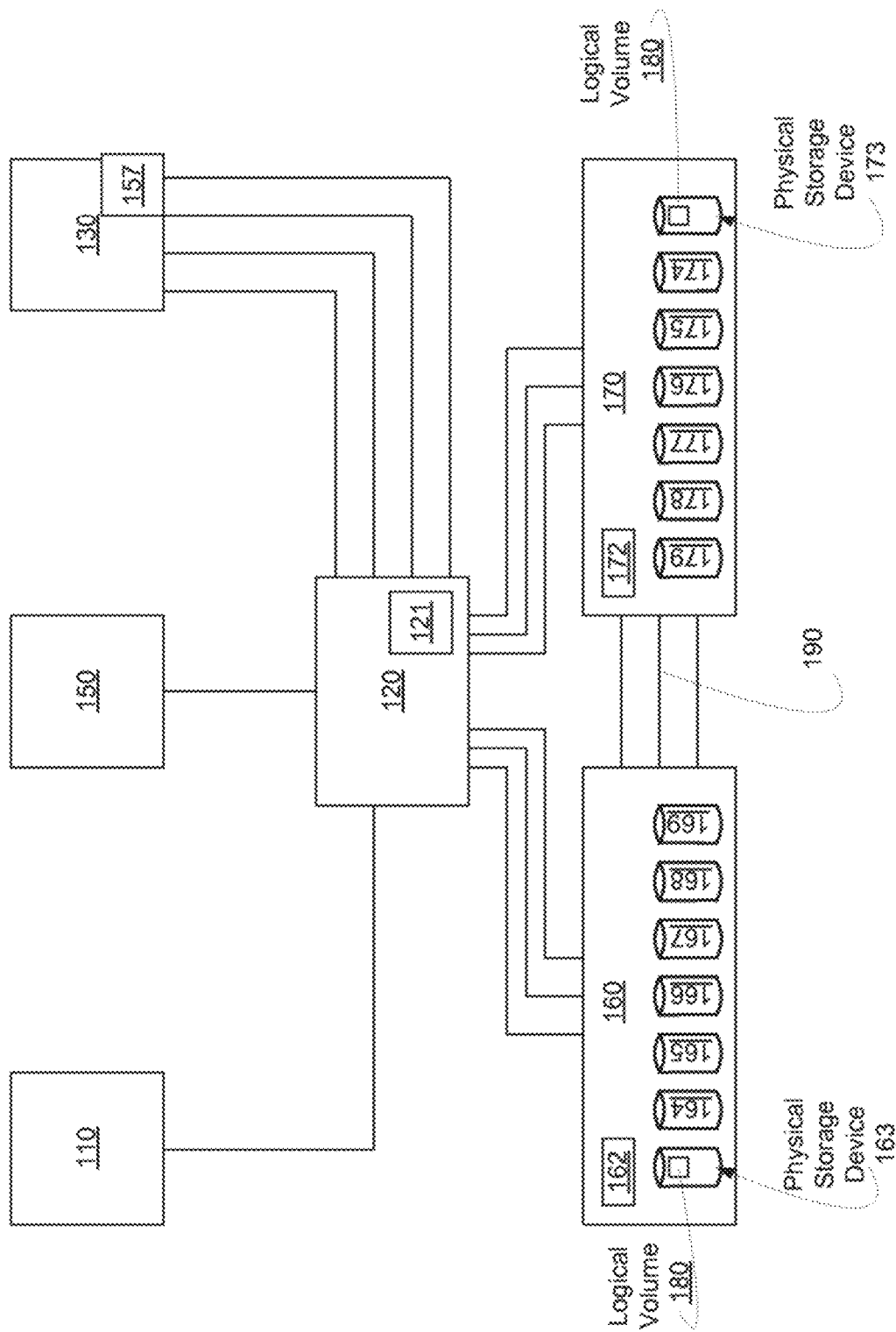
FIG. 2 illustrates another exemplary embodiment of a system for making a composite video with annotation(s)

Referring to FIG. 2, the computing devices 110, 130 and 150 are each communicatively connected to the communication fabric 120, such as a WAN or Internet. The network server 130 is a computing device that is owned and/or operated by a networking service provider, and computing devices 110 and 150 are owned and/or operated by individual network users. In certain embodiments, network server is owned and/or operated by a social network provider. In certain embodiments, the network server 130 provides access to the computing devices 110 and 150 to execute Applicants' source code 136 via a Software as a Service (SaaS) means.

In certain embodiments information fields are received from one or more computing devices 110, 130 and/or 150 and stored on the "Cloud" such as data storage library 160 and/or 170. Referring to FIG. 2, each of the data storage libraries 160 and 170 have corresponding physical storage devices, such as and without limitation physical data storage devices 163-169 for data storage library 160 and 173-179 for data storage library 170.

In certain embodiments, data storage library 160 and data storage library 170 are configured in a Peer To Peer Remote Copy ("PPRC") storage system, wherein the information fields in data storage library 160 is automatically backed up in data storage library 170. In certain embodiments, Applicants' PPRC storage system utilizes synchronous copying. In certain embodiments, Applicants' PPRC storage system utilizes asynchronous copying.

In the illustrated embodiment of FIG. 2, physical storage device 163 is configured to comprise logical volume 180. In certain embodiments, each physical storage device in data storage library 160 is configured to comprise a plurality of logical volumes. Similarly, each physical storage device in data storage library 170 is configured to comprise a corresponding plurality of logical volumes. In certain embodiments, each member of the social network is assigned a unique logical volume. In such embodiments a permission file 157 may be encoded in computer readable medium 133 or in data storage libraries 160 and 170 that associates each logical volume with a social network member and further associates each logical volume with access permissions for certain designated other social network users. Each social network user configures his/her own logical volume permissions. In certain embodiments, if a first user desires to remove access permissions from a second user, that first member simply accesses his/her permissions file and deletes the second user. Thereafter, the second user cannot retrieve data stored on the logical volume associated with the first user.

Figure 3:
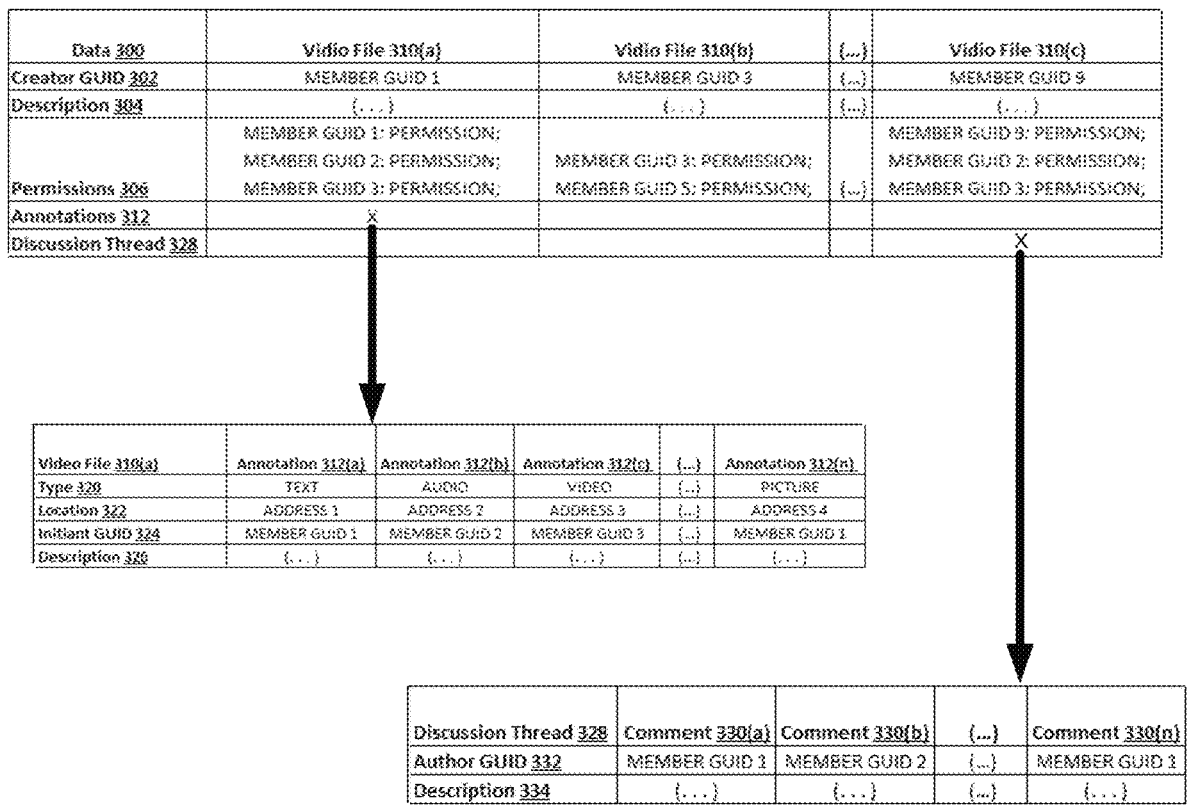
FIG. 3 is a table of information fields stored in association with each playable media file.

Referring to FIGS. 1, 2, and 3, Applicants' algorithm 136, and its functions, can be accessed by users of Applicants' network 100 to create, share, edit, associate one or more annotations with, and/or associate one or more discussion threads with, a Playable Media File. One member, using a computing device such as computing device 110 or 150, to access network server 130, streams a Playable Media File from its original storage location. In certain embodiments the Playable Media File is encoded in a unique logical volume accessible by a first user. That first user can grant access to the Playable Media File to one or more other users by storing access permissions in permission file 157. In certain embodiments the access includes levels such as, and without limitation, view only, view/edit, view/edit/share, and the like. In certain embodiments the access includes conditions or restrictions such as expirations dates, limitations on the number of times the file can be viewed, and the like.

Referring now to FIG. 3, when a user having permission streams the Playable Media file, and if that user associates an annotation with the Playable Media File, a data profile 300 is created for the Playable Media File and is stored on network server 130, and optionally on data storage library 160 or 170. Data profile 300 includes various information fields, including the Global Unique Identifier (GUID) 302 associated with the creating member, a description 304 of the Playable Media File (e.g., a title), and permissions 306 held by various members to access, edit, and/or share the Playable Media File. Data profile 300 may further include subsequently added annotations 312 and discussion threads 328.

Applicants' system and method further disclose an article of manufacture comprising a platform for information management, such as computing device 110, 130, and/or 150, comprising computer readable program code, such as API 116, API 156, and/or Applicants' social network source code 136, residing in a non-transitory computer readable medium, such as computer readable medium 113, 133, and/or 153, where that computer readable program code can be executed by a processor, such as processor 112 (FIG. 1) and/or 132 (FIG. 1), and/or 152, to implement Applicants' method recited in FIGS. 4-16.

Applicants' system and method further disclose a non-transitory computer readable medium wherein Applicants' computer program product is encoded herein. Applicants' computer program product comprises computer readable program code that can be executed by a programmable processor to implement Applicants' method recited in FIGS. 4-16. In either case, in certain embodiments, the computer readable program code is encoded in a non-transitory computer readable medium comprising, for example, a magnetic information storage medium, an optical information storage medium, an electronic information storage medium, and the like. "Electronic storage media," means, for example and without limitation, one or more devices, such as and without limitation, a PROM, EPROM, EEPROM, Flash PROM, compactflash, smartmedia, and the like.

A method for setting a bookmark during a recording of a playable media file is disclosed. In certain embodiments, a network user can use one of the computing devices 110 and 150 (FIG. 1) to record a playable media file of a live event. Again, FIG. 1 should not be taken as limiting. In other embodiments, any number of computing device that is capable of recording a playable media file of a live event can be used by a network user and can be part of the network 100.

Figure 15:
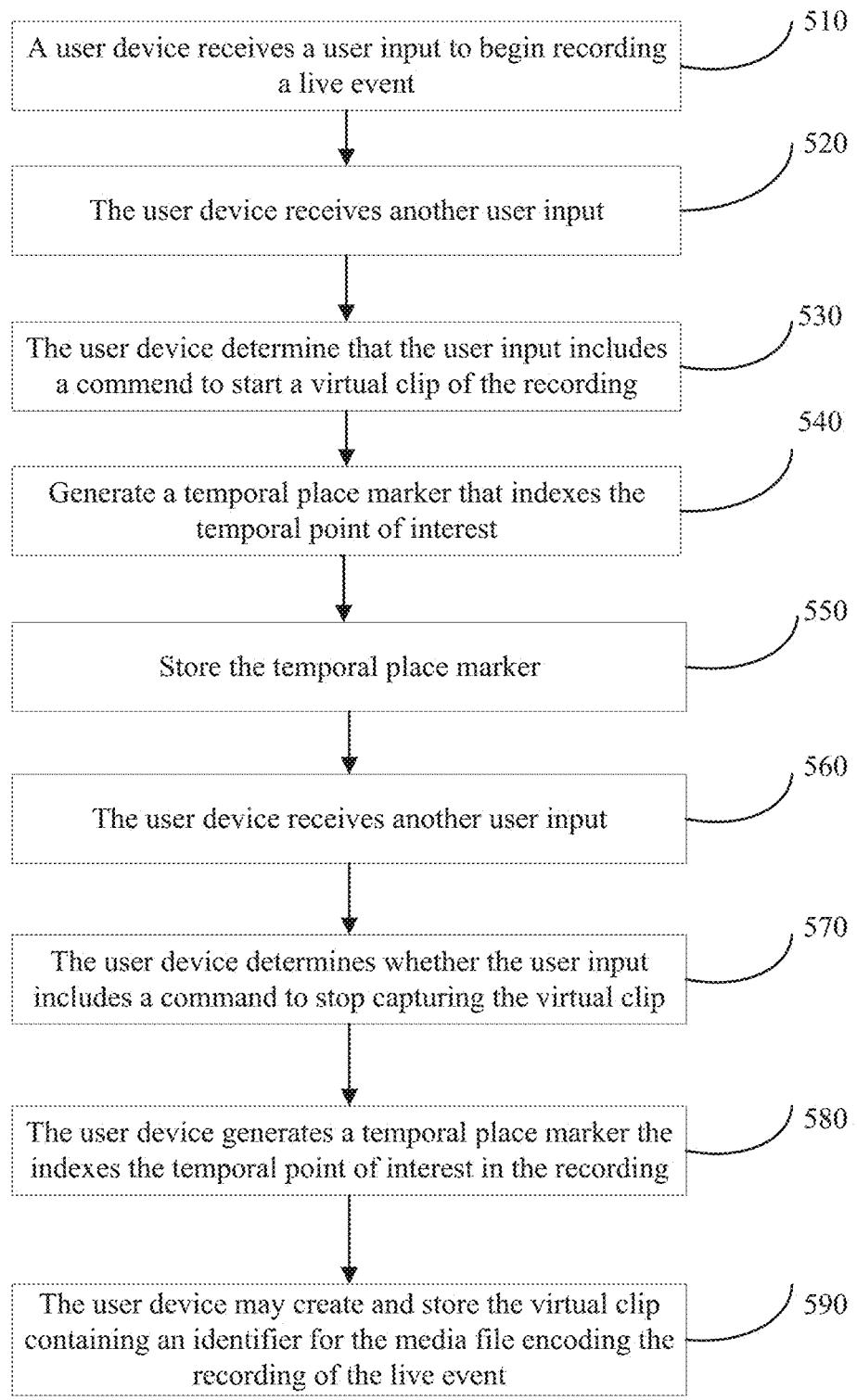
FIG. 15 is a flowchart of the method and/or process related to set a bookmark during a recording of a playable media file.

Referring to FIG. 15, a user device may be configured to, on its own or in cooperation with one or more servers as described above, create a virtual clip of a playable media file encoding a recording of a live event while the event and/or the recording is taking place. The exemplary method is described with reference to a touchscreen user device that is recording the event, and variations on the exemplary method are contemplated. For example, rather than touchscreen inputs, in other embodiments the user device may be configured to receive audio inputs and/or inputs from peripheral devices such as a keyboard, remote controller, and/or mouse. In other embodiments, the user device may not be recording the live event and may not create or store the playable media file; another device may create the playable media file and store it in a location from which the user device or another device accessible by the user may concurrently and/or later download and/or stream the media file.

At step 510, the user device receives a user input signaling the user device to begin recording the live event, and starts to record a playable media file of the live event. In conjunction with starting the recording, the user device may also display a user interface including one or more interactable graphical objects that serve as the user's controls for the virtual clip. At step 520, during the recording the user device receives another user input, and at step 530 the user device determines that the user input includes a command to start a virtual clip of the recording. At step 540, the user device generates a temporal place marker that indexes the temporal point of interest in the recording that corresponds to the time that the user initiated the virtual clip. In certain embodiments, the temporal place marker is stored on the user device or the recording computing device in step 550.

The user device continues to record the live event, subsequently receiving another user input at step 560. At step 570, the user device determines whether the user input includes a command to stop capturing the virtual clip; this command may be a selection of an END CLIP object in the user interface, or it may be a selection by the user to stop recording the live event. In either case, at step 580 the user device generates a temporal place marker that indexes the temporal point of interest in the recording that corresponds to the time that the user ended the virtual clip. At step 590, the user device may create and store the virtual clip containing an identifier for the media file encoding the recording of the live event, the first temporal place marker identifying the start time (i.e., time elapsed from the beginning of the recording) of the virtual clip, and the second temporal place marker identifying the end time of the virtual clip.

If the command to end the virtual clip did not terminate the recording of the live event, the steps 520-590 of creating a virtual clip may be repeated to capture a second virtual clip of the media file. In some embodiments, the user input that ends the capture of the first virtual clip may also serve as the user input that starts the capture of the second virtual clip. The playable media file and the virtual clip(s) may be transferred by the user device to a server or other computer storage device and later accessed using the systems described herein. Additionally or alternatively, the temporal place markers may be used to identify "trim" locations within the media file; the user device or recording device may store—only or additionally—the encoded content captured between the temporal place markers. In other embodiments of the method, the user device may be used to view the media file subsequent to the live event occurring, and to generate virtual clips of the media file as described above.

There are several different ways for a user to communicate to a recording computing device to generate a temporal bookmark that indexes a temporal point of interest during recording of a live event. In certain embodiments, when a user touches a screen of the recording computing device, the algorithm 136 comprising Applicants' source code generates a temporal place marker. In other embodiment, the algorithm 136 comprises voice recognition source code so that when the user speaks verbally to the recording computing device, a temporal place marker is generated. In yet other embodiments, the user is able to communicate to recording computing device using a control device 105 (FIG. 1), which is connected to the recording computing device via a connected data link. In other embodiments, the control device is connected to the recording computing device remotely via Bluetooth, ultra-wideband, wireless local area network, Wi-Fi, AirPort, Infrared, ZigBee, and or other similar technologies. A signal can be transferred from the control device 105 to the recording computing device so that the algorithm 136 comprising Applicants' source code generates a temporal place marker during the recording of a live event.

Figure 4:
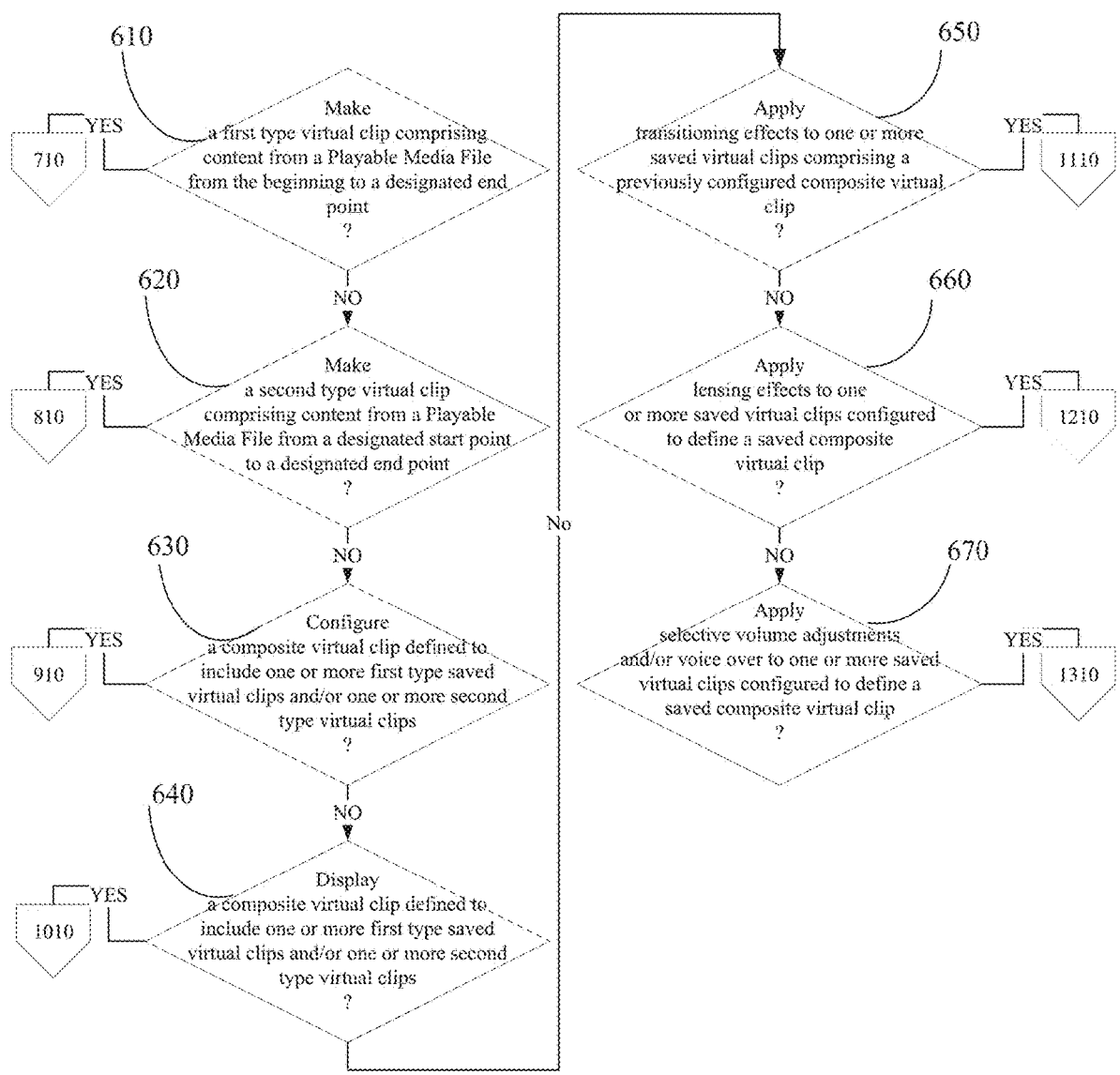
FIG. 4 summarizes steps in Applicants' method, steps implemented by Applicants' article of manufacture, and steps performed by a programmable processor implementing Applicants' computer program product.

The playable media file with at least one temporal bookmark generated from a recording computing device can be used to make a composite video file. Referring now to FIG. 4, in step 610 Applicants disclose determining whether to create a plurality of virtual clips, wherein each virtual clip comprises content encoded in one or more Media File, playable or static, from a beginning of the Media File, playable or static, up to a designated end point. The depicted order and labeled steps in FIG. 4 are indicative of one embodiment of the presented method. Further, the order in which a particular method occurs may or may not strictly adhere to the order of the corresponding steps shown in FIG. 4 because some users may choose to perform certain steps before other steps. A "Media File, playable or static," may be a file containing data that encodes one or more types of media content, such as audio content, video content, audio-visual content, image and other computer graphic content, text content, slide-show and similar sequenced-graphic content, and the like. Non-limiting examples of particular formats of media files include, XVI file, MP3 file, MP4 file, WMA file, WAV file, Flash, MPEG file, an image file (JPG, TIF, PNG, GIF, Bitmap, and the like), a PDF file, a text file (e.g., a .doc file), a VISIO file, a .ppt file, a .key file, a spreadsheet file, and any type of 3D media file. In certain embodiments, such a 3D media file requires holographic projection/holographic viewing. In certain embodiments, "Media File, playable or static," further includes any file which generates a Stereoscopic visual display that can be viewed through stereoscopic eyewear or played on 3D display technology such as 3D TV, and in certain embodiments comprises a Virtual Reality/Augmented Realty file that can be viewed through Virtual Reality devices such as Hololense, Oculus Rift, Sony Playstation VR, HCT VIVE, Razer OSBR HDK, Zeiss VR1, SOV VR, Freefly, and the like.

A "virtual clip" created from one or more of such media files may, in some embodiments, be a set of data points that together delineate a particular subset of the content encoded in the media file. Thus, the virtual clip is comprised of references that identify specific content in the corresponding media file, but the virtual clip is not necessarily itself a stored media file containing the content data. The content data may remain in its original storage location, and the present systems (e.g., described in FIGS. 1 and 2) may obtain the virtual clip, read the set of data points, access the media file in its original stored location, and then obtain (e.g., via file transfer or streaming) the subset of content that is delineated by the data points.

In some embodiments, the set of data points may include a start point and an end point; together with an identifier of the media file, the start point and end point may identify the content to be included in the virtual clip. The data describing the data points may be selected depending on the type of media file encoding the content. Non-limiting examples of start and end points include: in a video or audio file, a start time (e.g., a duration measured from the beginning of the video/audio content at time 0.0) and an end time which together define a "clip" of the video/audio content; in an image, a starting coordinate (e.g., with respect to a top-left corner of the image being at coordinate (0, 0)) of a first pixel representing the top-left corner of a rectangular region of the image, and an ending coordinate of a second pixel representing the lower-right corner of the region; in a slide show, a starting slide number and an ending slide number; in a plain text, formatted text, or binary text file, a starting pointer and an ending pointer identifying positions in the character stream. In a particular example of a 2D or 3D media file encoding a recorded computer simulation, each data point in the set may include a tune (e.g., time elapsed since the beginning of the simulation), a coordinate location within the simulated environment (e.g., xyz coordinates of a user-controlled camera within a geographic environment mapped to a Cartesian coordinate system), and data (e.g., a vector) identifying the camera line-of-sight.

Figure 5:
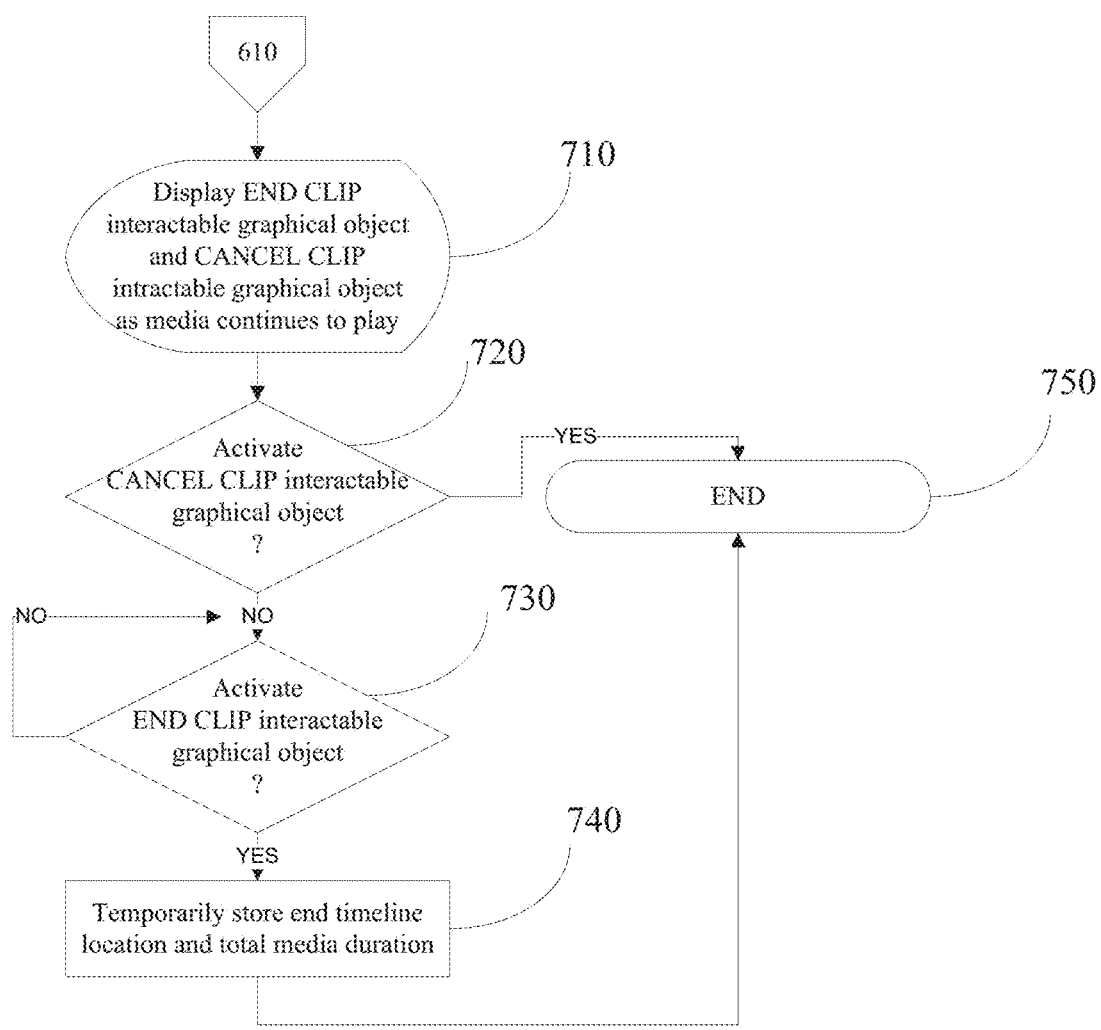
FIG. 5 summarizes steps in Applicants' method, steps implemented by Applicants' article of manufacture, and steps performed by a programmable processor implementing Applicants' computer program product.

Referring to FIG. 4, if a user elects to create such a plurality of virtual clips, the system may identify the beginning of the media file as the start point of the virtual clip, and then transitions from step 610 (FIG. 4) to step 710 (FIG. 5). Referring now to FIG. 5, in step 710 the method, without pausing the media play, displays an END CLIP interactable graphical object and a CANCEL CLIP interactable graphical object.

If the user activates the CANCEL CLIP interactable graphical object in step 720, then the method transitions from step 720 to step 750 and ends. Alternatively, if the user does not activate the CANCEL CLIP interactable graphical object in step 710, then the method transitions from step 710 to step 730 wherein the method determines if the END CLIP interactable graphical object has been activated. If the method determines in step 730 that the END CLIP interactable graphical object has not been activated, then the method waits at step 730, while the system continues to play or otherwise display the media file, until the user activates the END CLIP interactable graphical object. At step 740, the system determines that the user has selected to end the virtual clip, determines the location within the media file at which the virtual clip should end, and temporarily stores a start point, an end point, and any other data needed to identify the virtual clip.

In one example, step 740 for a virtual clip of a video or audio file may include identifying the time elapsed in the content when the END CLIP interactable graphical object was selected, and then creating and storing a virtual clip containing the media file identifier, a start time of 0.0, and an end time representing the time elapsed. In another example, rather than storing an end time, the system may subtract the start time from the end time to determine a duration of the virtual clip, and may store the start time and the duration in the virtual clip. In another example, step 740 for a virtual clip of an image file may include identifying an end coordinate of the pixel over which a mouse cursor was located when the END CLIP interactable graphical object was selected, and then creating and storing a virtual clip containing the media file identifier, a start point of (0, 0), and an end point at the end coordinate. The virtual clip would thus identify the region within an implied bounding box; if the end coordinate were (x, y), the bounding box would have clockwise corners at (0, 0), (x, 0), (x, y), and (0, y). In another example, step 740 for a virtual clip of a text file may include identifying a cursor location within the text file and determining a target position, within the data stream (e.g., ASCII or other plain text stream, rich text or other formatted text stream, binary file stream, etc.) representing the text file, corresponding to the cursor location, then creating and storing a virtual clip containing the media file identifier, a starting stream position of 0, and the target position as an ending stream position.

In certain embodiments, in step 740 a virtual clip is saved to the user's computing device. In certain embodiments, in step 740 the virtual clip is saved to Applicants' network server 130 (FIG. 1).

Referring to FIG. 4 again, if the user elects in step 610 NOT to create a plurality of virtual clips each from a beginning of the media file to a designated end point, then the method transitions from step 610 to step 620 wherein the user may elect to create a plurality of virtual clips comprising content from one or more Media File, playable or static from a designated start point to a designated end point. In one embodiment, to determine that the user has elected to create a virtual clip, the system may display on the user's device a user interface that displays the media file along with a START CLIP interactable graphical object, and the system may receive a user input indicating the START CLIP interactable graphical object was selected. If the user elects to create a plurality of virtual clips, where each virtual clip comprises content from one or more Media File, playable or statics, and wherein the user specifies a designated timeline location to begin the virtual clip, then the system may identify, as the start point of the virtual clip, the point within the media file that was "in focus" when the START CLIP interactable graphical object was selected, and then transitions from step 620 to step 810 (FIG. 6).

A determination of the "in focus" point, and thus the start point, may depend on the type of the content file, but in any case can be objectively determined. In a playable media file, the time during playback that the START CLIP object is selected may be the start point; additional data may be needed for 2D or 3D recorded simulations, such as the camera location and line-of-sight when the START CLIP object is selected. In a slide show file, the "in focus" point may be the slide being displayed when the START CLIP object is selected, and in other static files such as text and image files, the cursor position may identify the "in focus" point.

Figure 6:
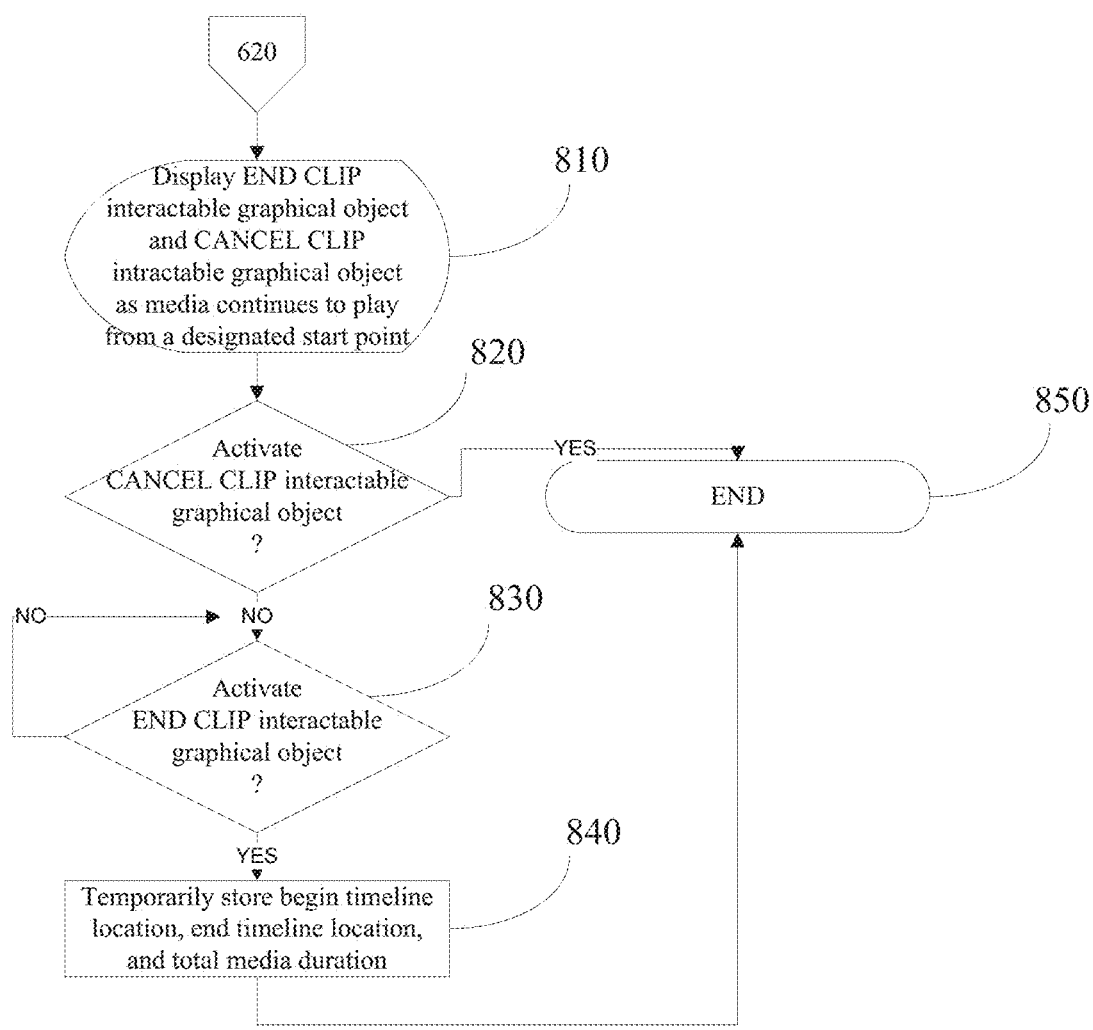
FIG. 6 summarizes steps in Applicants' method, steps implemented by Applicants' article of manufacture, and steps performed by a programmable processor implementing Applicants' computer program product.

Referring now to FIG. 6, in step 810 the method streams the Media File, playable or static from a designated start point, and without pausing the media play, displays an END CLIP interactable graphical object and a CANCEL CLIP interactable graphical object. If the user activates the CANCEL CLIP interactable graphical object in step 820, then the method transitions from step 820 to step 850 and ends. Alternatively, if the user does not activate the CANCEL CLIP interactable graphical object in step 810, then the method transitions from step 810 to step 830 wherein the method determines if the END CLIP interactable graphical object has been activated. If the method determines in step 830 that the END CLIP interactable graphical object has not been activated, then the method waits at step 830, while the system continues to play or otherwise display the media file, until the user activates the END CLIP interactable graphical object. At step 840, the system determines that the user has selected to end the virtual clip, determines the location within the media file at which the virtual clip should end, and temporarily stores a start point, an end point, and any other data needed to identify the virtual clip. Any of the above examples described with respect to step 740 of FIG. 5 may illustrate the system's operation to create and store the virtual clip, with the additional processing required to identify the start point within the media file. For example, to obtain a virtual clip of an image, the system may provide a user interface that enables the user to draw a visible bounding box (e.g., using a mouse cursor and clicks), and may identify the start and end points using the top-left and lower-right coordinates of the visible bounding box.

In certain embodiments, in step 840 the virtual clip is saved to the user's computing device. In certain embodiments, in step 840 the virtual clip is saved to Applicants' network server 130 (FIG. 1).

Referring to FIG. 4, if the user elects in step 610 NOT to create a plurality of virtual clips each from a beginning to a designated end point, and if the user elects NOT to create a plurality of virtual clips, where each virtual clip comprises content from one or more Media File, playable or statics, and wherein the user specifies a designated timeline location to begin the virtual clip, then the method transitions from step 620 to step 630 wherein the method determines if the user elects to configure a composite virtual clip.

Figure 7:
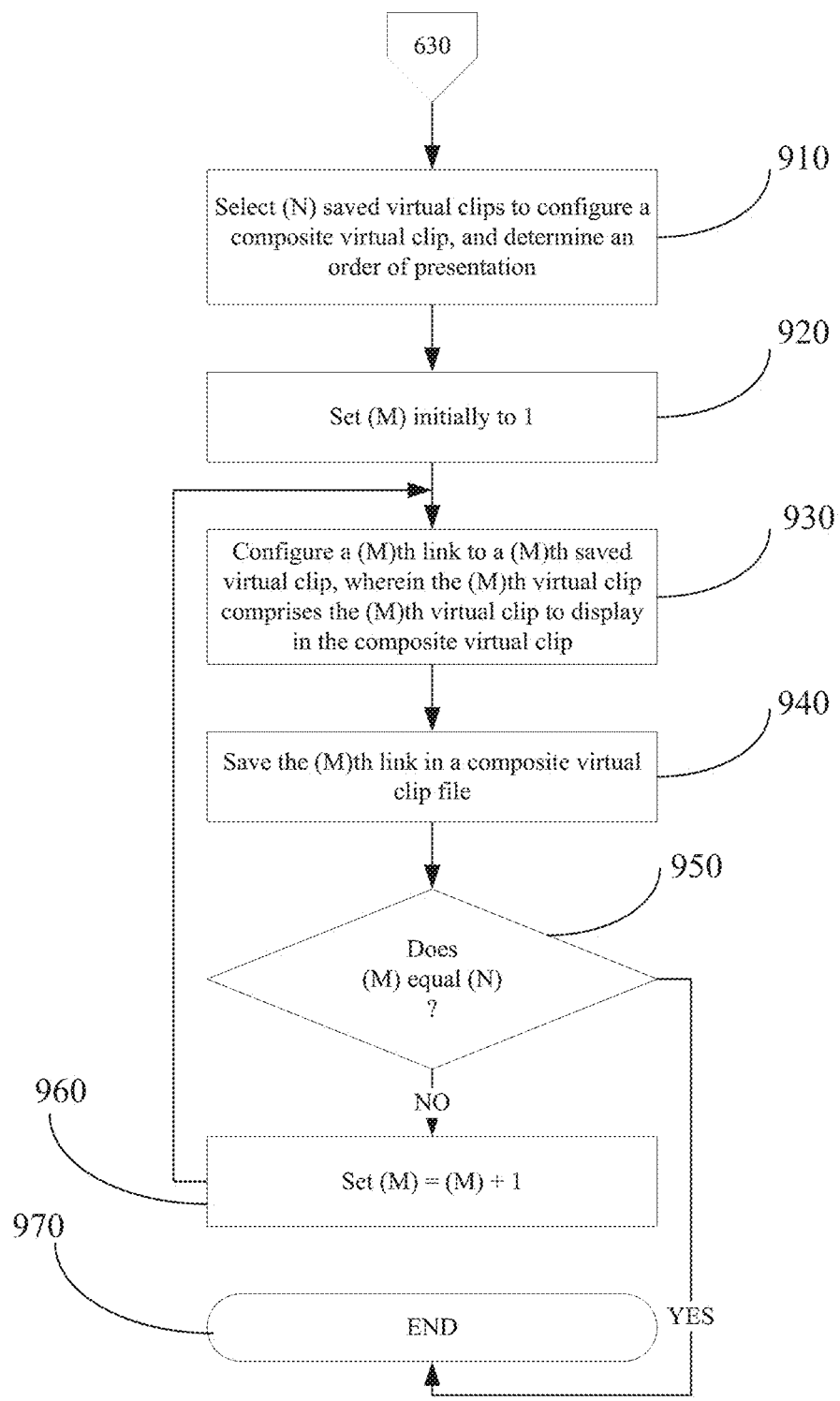
FIG. 7 summarizes steps in Applicants' method, steps implemented by Applicants' article of manufacture, and steps performed by a programmable processor implementing Applicants' computer program product.
Figure 8:
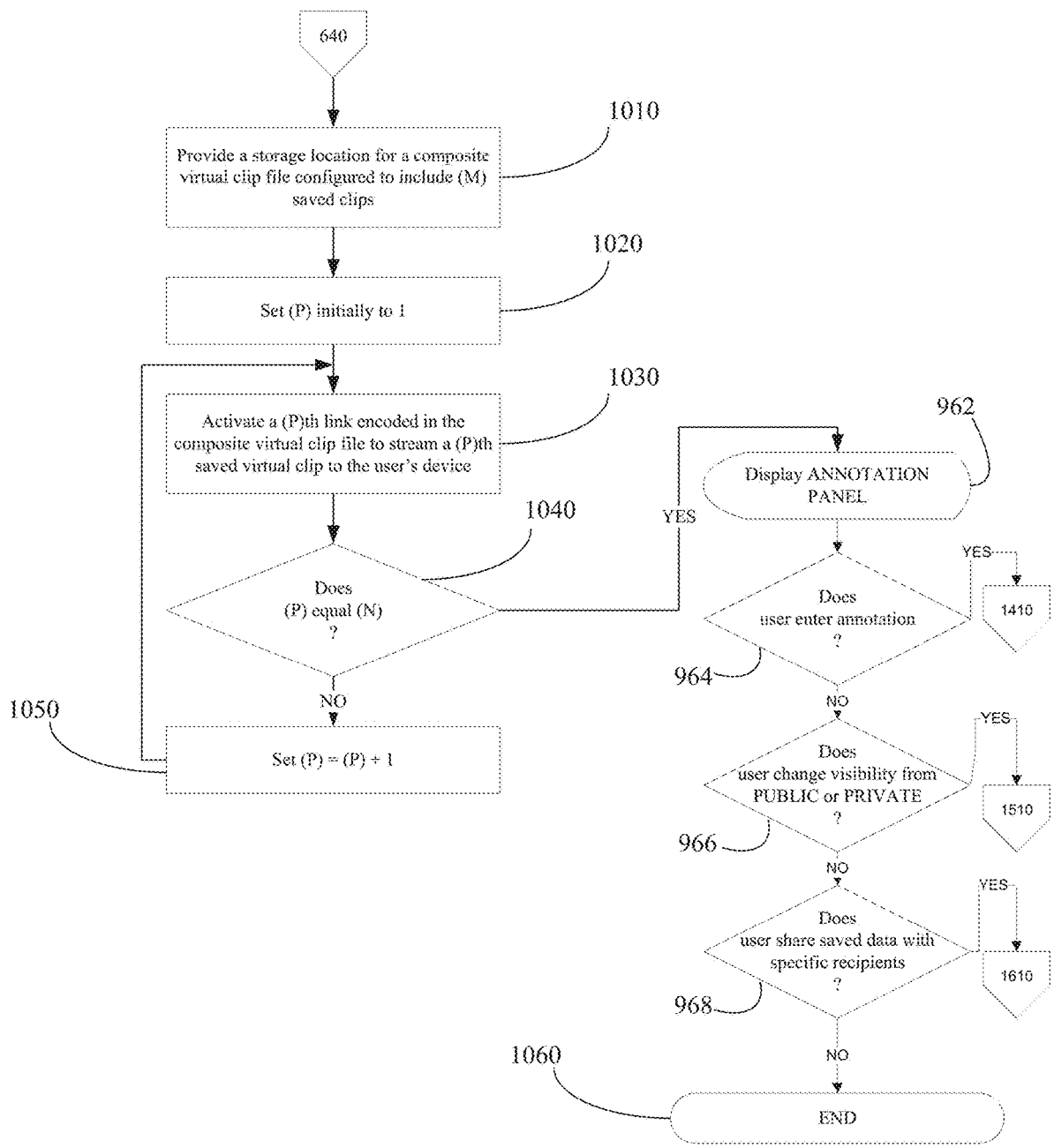
FIG. 8 summarizes steps in Applicants' method, steps implemented by Applicants' article of manufacture, and steps performed by a programmable processor implementing Applicants' computer program product.

If the user elects to configure a composite virtual clip in step 630, the method transitions from step 630 to step 910. Referring now to FIG. 7, in step 910 the method selects (N) saved virtual clips to configure a composite virtual clip, and determines an order of presentation for those (N) virtual clips.

In step 920, the method sets (M) initially to L In step 930, the method configures a (M)th link to a (M)th saved virtual clip, wherein the (M)th saved virtual clip will be the (M)th virtual clip to be displayed when the composite virtual clip is activated. In step 930, the method saves the (M)th link in a composite virtual clip file.

In step 950, the method determines if (M) equals (N), i.e. if all (N) links to the (N) selected (N) saved virtual clips have been created and saved. If the method determines in step 950 that (M) does not equal (N), then the method transitions from step 950 to step 960 wherein the method increments (M) by 1, i.e. sets (M) equal to (M)+1. The method transitions from step 960 to step 930 and continues as described herein. Alternatively, if the method determines in step 950 that (M) equals (N), then the method transitions from step 950 to step 970 and ends.

If the user elects in step 610 NOT to create a plurality of virtual clips each from a beginning to a designated end point, and if the user elects in step 620 NOT to create a plurality of virtual clips, where each virtual clip comprises content from one or more Media File, playable or statics, and wherein the user specifies a designated timeline location to begin the virtual clip, and if the user does NOT elect in step 630 to configure a composite virtual clip in step 630, then in step 640 the method determines whether to display a composite virtual clip.

If the user elects to display a composite virtual clip in step 640, the method transitions to step 1010 (FIG. 8) where the method provides a storage location for a composite virtual clip file configured to access (M) saved clips. In step 1020, the method sets (P) initially to 1. In step 1030 the method activates a (P)th link encoded in the composite virtual clip file to stream a (P)th saved virtual clip to the user's device.

In step 1040 the method determines if all (N) clips comprising the selected composite virtual clip have been displayed, i.e. if (P) equals (N). If the method determines in step 1040 that (P) does not equal (N), then the method transitions from step 1040 to step 1050 and increments (P) by 1, i.e. sets (P) equal to (P)+1. The method transitions from step 1050 to step 1030 and continues as described herein. Alternatively, if the method determines in step 1040 that (P) equals (N), the method transitions to step 962 wherein the method displays an Annotation Panel.

In step 964, the method determines if the user entered an annotation in the Annotation panel of step 962. If the method determines in step 964 is a user entered an annotation in the Annotation Panel, then the method transitions from step 964 to step 1410. Alternatively, if the user did not enter an annotation in the Annotation panel of step 962, then the method transitions from step 964 to step 966 wherein the method determines if the user elects to change visibility from PUBLIC to PRIVATE.

If the method determines in the 966 that the user does not elect to change the visibility of the identified content, then the method transitions from step 966 to step 968 wherein the method determines if the user elects to share saved data with specific recipients. If the user elects to share saved data with specific recipients, then the method transitions from step 966 to step 1510. If the user elects not to share saved data with specific recipients, then the method transitions from step 968 to step 1060 and ends.

Figure 12:
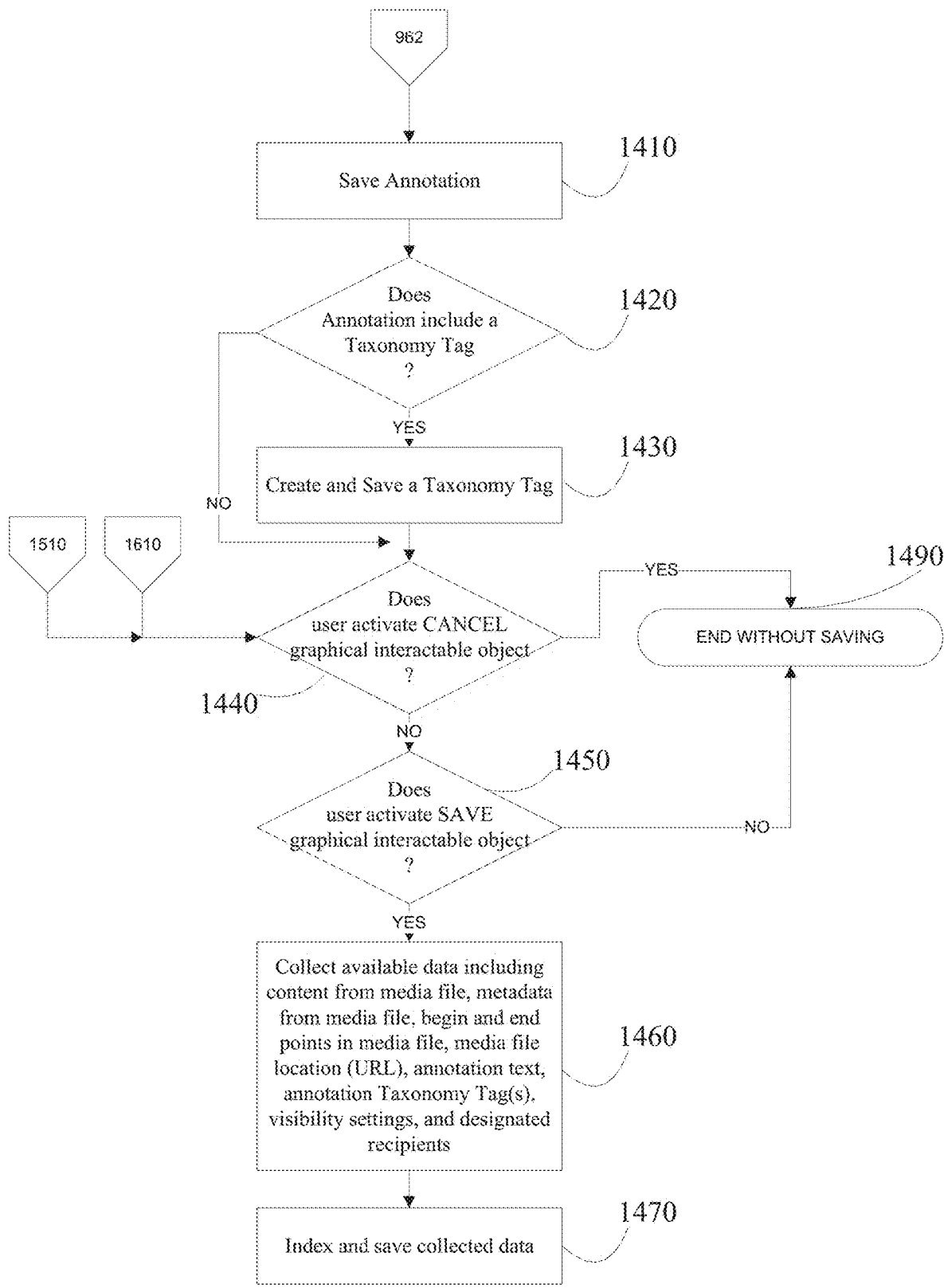
FIG. 12 summarizes steps in Applicants' method, steps implemented by Applicants' article of manufacture, and steps performed by a programmable processor implementing Applicants' computer program product.
Figure 13:
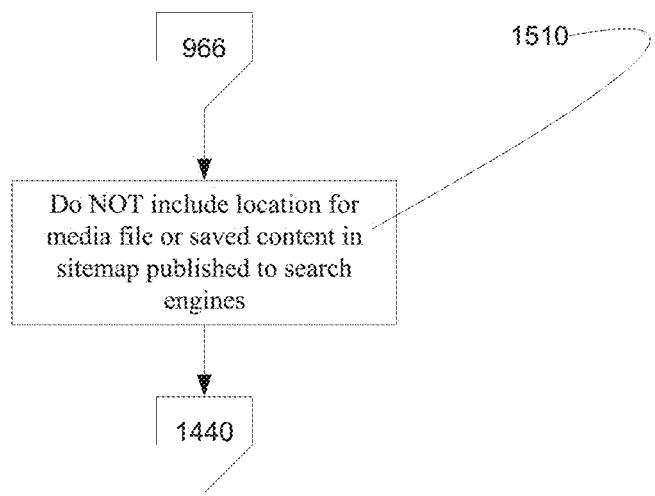
FIG. 13 summarizes steps in Applicants' method, steps implemented by Applicants' article of manufacture, and steps performed by a programmable processor implementing Applicants' computer program product.
Figure 14:
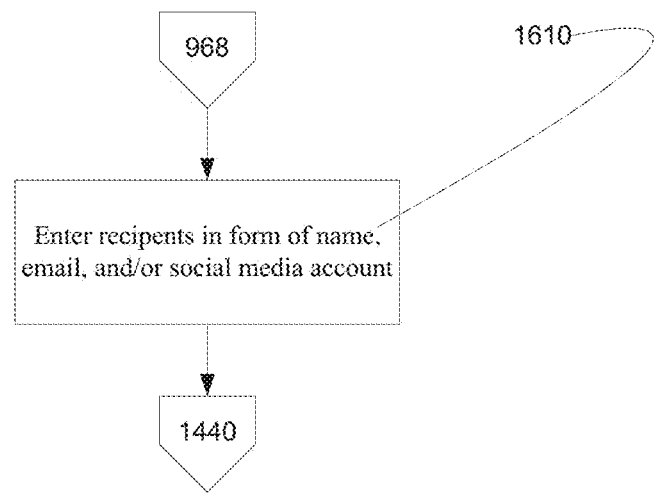
FIG. 14 summarizes steps in Applicants' method, steps implemented by Applicants' article of manufacture, and steps performed by a programmable processor implementing Applicants' computer program product.

If the method determines in step 964 is a user entered an annotation in the Annotation Panel, then the method transitions from step 964 to step 1410. Referring now to FIG. 12, in step 1410 the method saves the annotation entered into the Annotation Panel of step 962. In certain embodiments, in step 1410 the user's annotation is saved to the user's computing device. In certain embodiments, in step 1410 the user's annotation is saved to server 140 (FIG. 1).

In step 1420, the method determines whether a user input associated with the virtual clip, such as an annotation, conforms to a predetermined format. In certain embodiments, the format comprises a tag identifier indicating the user input includes taxonomy tags, a first tag following the tag identifier and identifying a first category of the composite virtual clip, and (P) subtag(s) sequentially following the first tag and each including a delimiter indicating a previous tag is complete and an additional tag follows, identifying an additional category of the virtual clip. The tag identifier may be a character (the "#" or hash symbol in the examples herein), character string, or other data element that the system is configured to identify as an indicator that the text following the tag identifier should conform to the taxonomy tag format, and contains at least one tag if so. In some embodiments, the format comprises zero subtags. In other embodiments, the format comprises 1, 2, 3, 4, 5, or any number that is greater than 1 subtags. In step 1430, the method creates and saves a taxonomy tag for the annotation saved in step 1410. In certain embodiments, the taxonomy tag comprises a form "#content:TITLE." in other embodiments, the taxonomy tag comprises a form "#first tag: subtag1:subtag2: . . . :subtagP," where the first tag and each subtag(1 . . . P) are character strings separated by the delimiter character ":".

Further, in step 1430, the method also identifies one or more taxonomy tags from the user and associates the virtual clip with one or more categories identified by the one or more taxonomy tags. In one embodiment, each tag immediately following a tag identifier corresponds to a main category, and each subtag corresponds to a sub-category of the (sub)category corresponding to the immediately preceding tag (i.e., the tag to the left of the delimiter). Thus, one or more categories are arranged into a hierarchy determined from a sequence of the corresponding tags identified in the user input. As described, each taxonomy tag identifies a corresponding hierarchy of categories. In some embodiments, the method associates the virtual clip with each of the one or more categories corresponding to one of the tags/subtags in each taxonomy tag associated with the virtual clip.

In some embodiments, the categories and any corresponding hierarchy may exist in a data store (e.g., the global data store), and associating the taxonomy tags with the categories may include matching the tags to the categories. Additionally or alternatively, the taxonomy tags and their respective tagging sequence may represent a realtime, ad hoc "categorization" in absence of a centralized hierarchy. The virtual clip may be associated with the taxonomy tags to produce a searchable virtual clip that is delivered to a requesting device in response to a query from the requesting device for any of the plurality of virtual clips that are associated with the taxonomy tags. In some embodiments, the system may require that the taxonomy tags of the query appear in the same sequence of the stored taxonomy tags, in order to improve accuracy and relevance of the search results. Thus, associating a virtual clip with the taxonomy tags may include creating, based on an order in an input character string of the one or more taxonomy tags, a directed relationship between a first taxonomy tag and a second taxonomy tag sequentially following the first taxonomy tag in the character string, the directed relationship enabling a user to retrieve the first virtual clip from the stored data using an ordered combination of the first and second taxonomy tags as the query. Additionally, the system may provide for the query to include a user identifier, such that the virtual clips may further be searched to return any virtual clips that have the corresponding taxonomy tags and were created by a particular user. This configuration also provides for a user to configure the associated user account to "follow" a particular user, and further a particular set of taxonomy tags; subsequent to implementing this configuration, the system may automatically send matching virtual clips to the user's account.

Figure 17A:
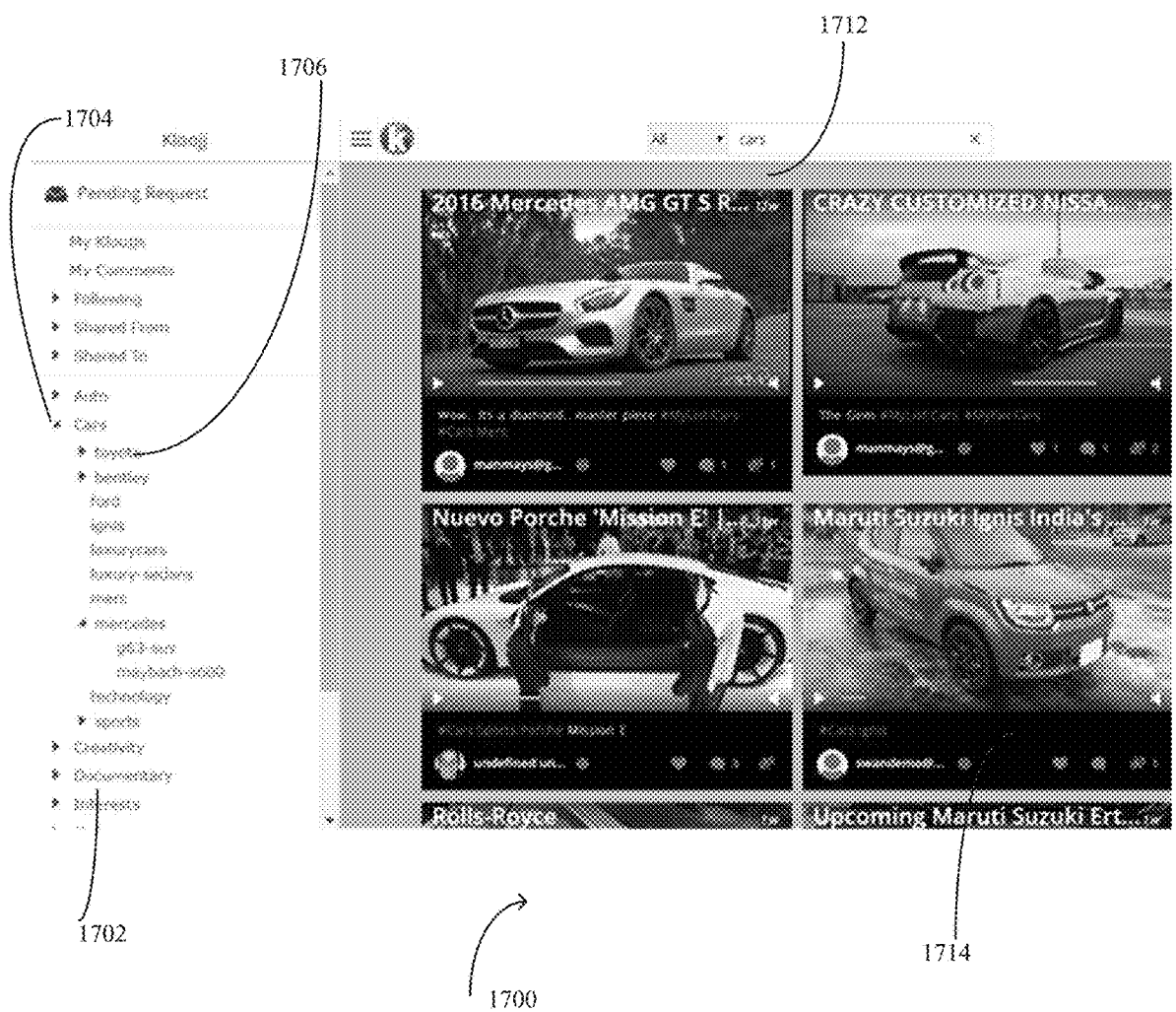
FIG. 17A is an example of a graphical user interface for tagging.

Referring to FIG. 17A, the system may generate a graphical user interface (GUI) 1700 for display to a user on a user device. The GUI 1700 may include a navigation element 1702 that displays visual representations of one or more of the category hierarchies, in accordance with parameters that may be provided by the user. For example, the GUI may enable the user to configure the navigation element 1702 to display a particular subset of all accessible (i.e., to the user via permissions in a user account) hierarchies, non-limiting examples of such a subset including: all hierarchies derived from taxonomy tags associated with virtual clips created, stored, and/or saved (e.g., via a bookmark function) by the user; all hierarchies derived from taxonomy tags of virtual clips shared with the user's user account; each hierarchy derived from a taxonomy tag used within a specified portion of a social network; and the like. The GUI 1700 may enable the user to interact with the displayed hierarchies, such as by displaying an interactable icon (e.g., an arrow 1704) indicating that a displayed category 1706 has one or more subcategories; selecting the icon may cause the system to update the navigation element 1702 to display the subcategory/ies that were previously hidden.

In some embodiments, the user may be able to select a displayed category 1706; when the system receives the user's selection, the system may filter all virtual clips accessible by the user to produce a subset of such virtual clips that are also associated with the selected category 1706, as specified by a taxonomy tag associated with the virtual clip. The system may then update the GUI 1700 to include a content display panel 1712 displaying visual representations 1714 of the virtual clips that belong to the filtered subset. The visual representations 1714 may be interactable graphical objects, such as a selectable element that generates a user input causing the system to update the GUI 1700 to include a virtual clip display panel (not shown) that displays the virtual clip associated with the selected visual representation 1714.

Figure 17B:
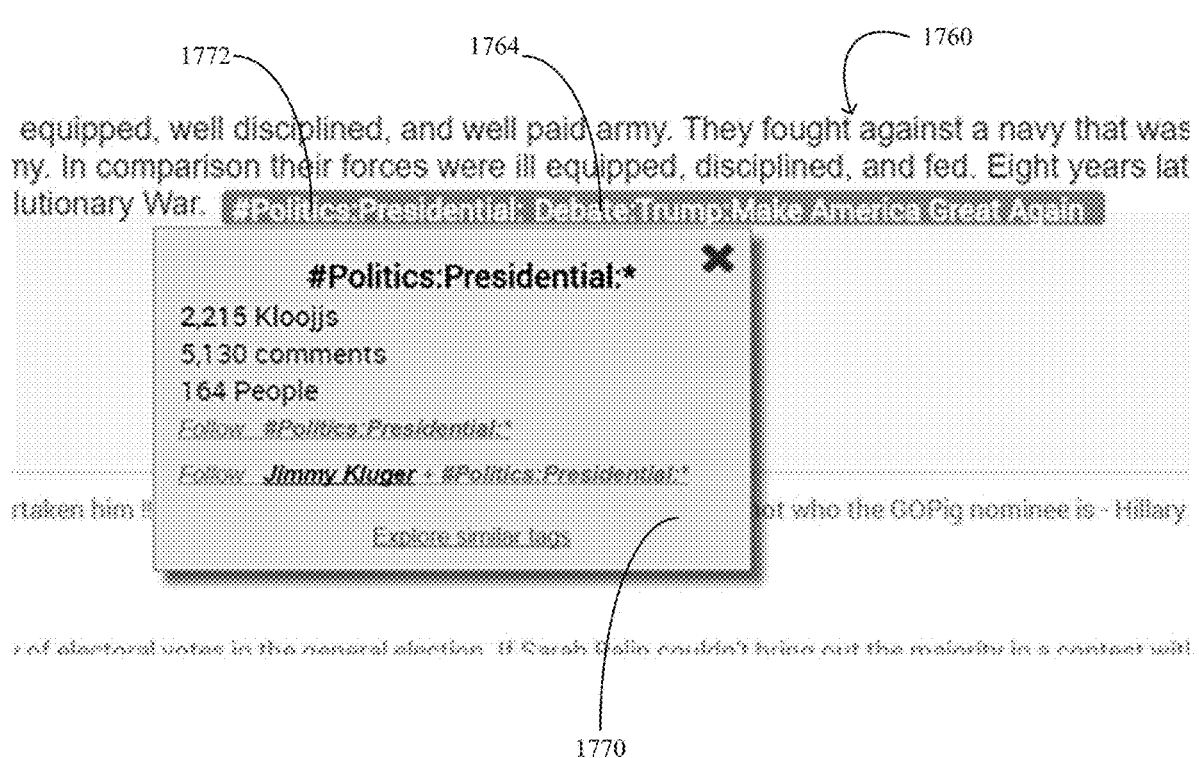
FIG. 17B is an example of a graphical user interface that enables a user to configure his user account to identify virtual clips in a particular subcategory.

The system may use the taxonomy tags associated with a virtual clip to filter virtual clips according to any suitable parameter or combination of parameters. FIG. 17B illustrates an example GUI 1760 that enables a user to configure his user account to identify virtual clips in a particular subcategory, and further to identify virtual clips created by a particular user and belonging to a particular subcategory. FIG. 17B further shows that the system may configure such filtering in-context—that is, the filtering may be performed upon encountering a taxonomy tag 1764 of a virtual clip 1762 while viewing the virtual clip 1762 (of a text file in the illustrated example), rather than from a dedicated category navigation system as described with respect to FIG. 17A. In one embodiment, the system may configure the GUI 1760 to render the taxonomy tag 1764 as an interactable object; the user may, for example, tap on or direct a mouse cursor to hover over the taxonomy tag 1764, producing a user input that the system processes and in turn updates the GUI 1760 to include a popup information window 1770 containing information as well as objects that may initiate commands.

One such object 1772 may invoke a filtering command that causes the system to configure the user account to aggregate references to newly posted virtual clips containing a taxonomy tag with a certain (sub)category. In the illustrated example, the user is enabled to click on the object 1772 to "follow" the subcategory "Politics:Presidential:*," the wildcard indicating that virtual clips associated with any subcategory of "Presidential" will be included in the aggregation. Another such object 1774 may invoke a filtering command that is constructed from the category hierarchy of the taxonomy tag as well as additional metadata of the virtual clip. In the illustrated example, the additional metadata includes the user identifier of the user that created or "posted" the virtual clip 1762. The object 1774 thus invites the user to aggregate virtual clips associated with the subcategory only if the virtual clips were created or posted by the identified user.

The taxonomy tags may further be used to aggregate information about social network usage of particular tags, and the GUI 1760 may be used to present such information. The illustrated information window 1770 displays exemplary network aggregation data, including a number of virtual clips network-wide having the selected taxonomy tag, a number of annotations and/or comments made on virtual clips in the corresponding category, and a number of users who have associated virtual clips or otherwise have participated in the subcategory. Any suitable metadata associated with the virtual clips may be aggregated and presented for analysis in this manner.

Referring again to FIG. 12, in step 1440, the method determines if the user activates a CANCEL graphical interactable object. If the method determines that the user does activate the CANCEL graphical interactable object, then the method transitions from step 1440 to step 1490 wherein the method ends without saving any selected content.

Alternatively, if the method determines in step 1440 that the user does not activate the CANCEL graphical interactable object, then the method transitions from step 1440 to step 1450 wherein the method determines if the user activates the SAVE graphical interactable object.

If the method determines in step 1450 that the user activates the SAVE graphical interactable object, then the method transitions from step 1450 to step 1460 wherein the method collects available data including content from the media file, metadata from the media file, begin and end points in the media file, media file location (URL), annotation text, annotation Taxonomy Tag(s), visibility settings, and designated recipients.

The method transitions from step 1460 to step 1470 wherein the method indexes and saves the collected data of step 1460. The method transition from step 1470 to step 1480 wherein the method resumes the media file play.

If the user elects to change the visibility settings in step 966 (FIG. 8), then the method transitions from step 966 to step 1510 (FIG. 13) wherein the method does NOT include a location for the media file, or a location for any saved data abstracted from that media file, in a sitemap published to search engines. The method transitions from step 1510 to step 1440 and continues as described herein.

If a user elects to provide saved content to specific persons in step 968, then the method transitions from step 968 to step 1610 wherein the method enters recipients in the form of name(s), email(s), and/or social media account(s). The method transitions from step 1610 to step 1440 and continues as described herein.

If a user elects in step 650 to apply one or more transitioning effect to one or more saved virtual clips, then the method transitions from step 650 to step 1110. As those skilled in the art will appreciate, a "transition" comprises an animation-like effect when Applicants' method to display a composite virtual clip moves from one previously saved virtual clip to a next previously saved virtual clip during an on-screen presentation. Applicants' method allows control the speed of each transition effect. In addition, Applicants' method also permits the addition of sound transitions when moving from a saved virtual clip to the next saved virtual clip.

Figure 9:
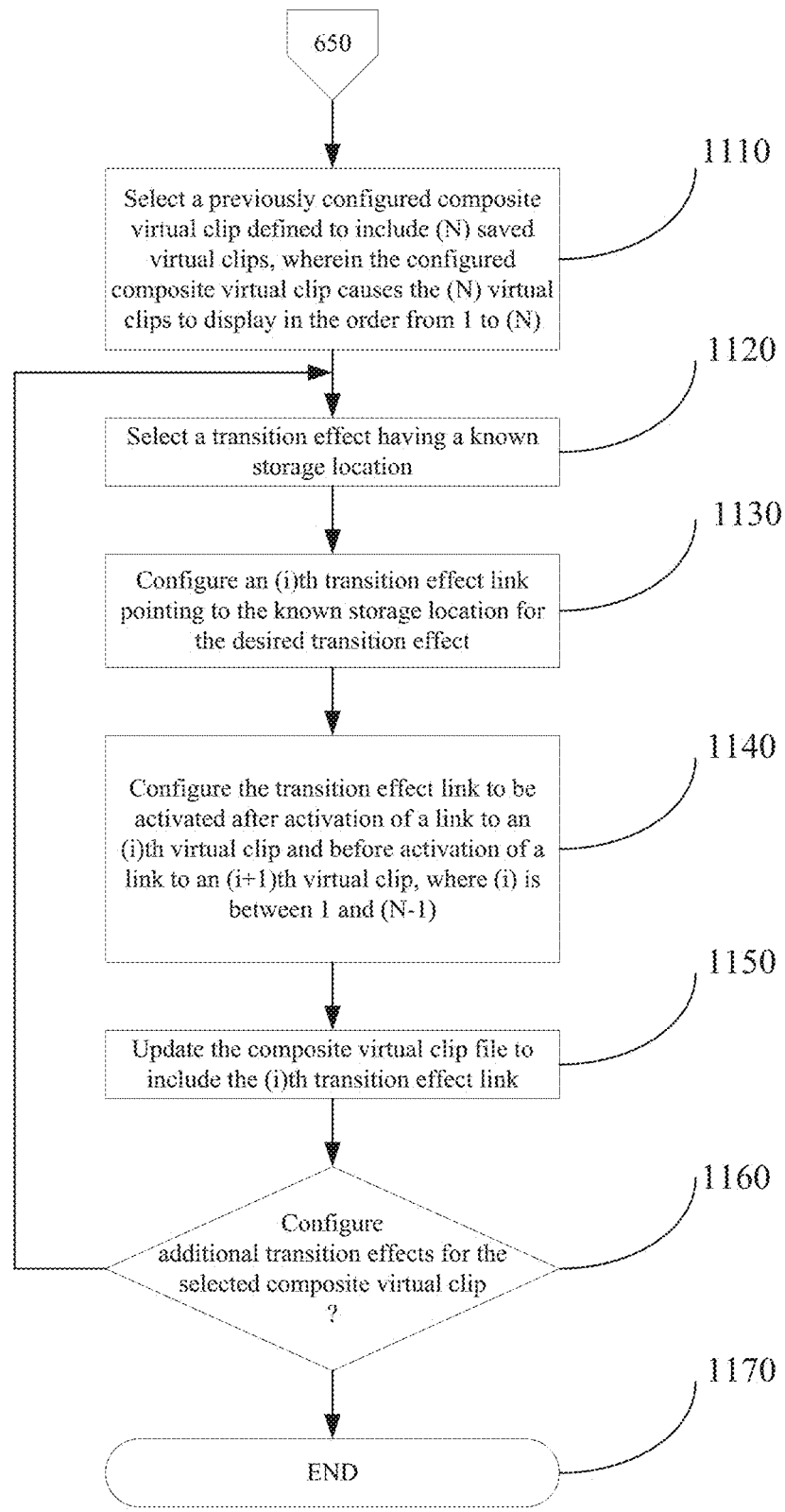
FIG. 9 summarizes steps in Applicants' method, steps implemented by Applicants' article of manufacture, and steps performed by a programmable processor implementing Applicants' computer program product.

If a user desires in step 650 to add one or more transition effects to a previously configured composite virtual clip, Applicants' method transitions from step 650 to step 1110 (FIG. 9). Referring now to FIG. 9, in step 1110 the method selects a previously configured composite virtual clip, wherein that composite virtual clip is configured to include (N) previously saved virtual clips in an order from 1 to (N).

In step 1120, the method selects a transition effect having a known storage location.

In step 1130, the method configures an (i)th transition effect link pointing to the known storage location for the desired transition effect.

In step 1140, the method configures the (i)th transition effect link to be activated after activation of a link to an (i)th virtual clip and before activation of a link to an (i+1)th virtual clip. In step 1150, the method updates the composite virtual clip file to include the (i)th transition effect link.

In step 1160, the method determines if the user desires to configure additional transition effects for the selected composite virtual clip. If the user elects to configure additional transition effect links, then the method transition from step 1160 to step 1120 and continues as described herein. Alternatively, if the user does not elect to configure additional transition effect links, then the method transition from step 1160 to step 1170 and ends.

If a user desires in step 660 to add one or more lensing effects to a previously configured composite virtual clip, Applicants' method transitions from step 660 to step 1210 (FIG. 10) As those skilled in the art will appreciate, a "lensing" effect includes, for example and without limitation, overlay of one or more color filters, image distortions, and annotations.

Figure 10:
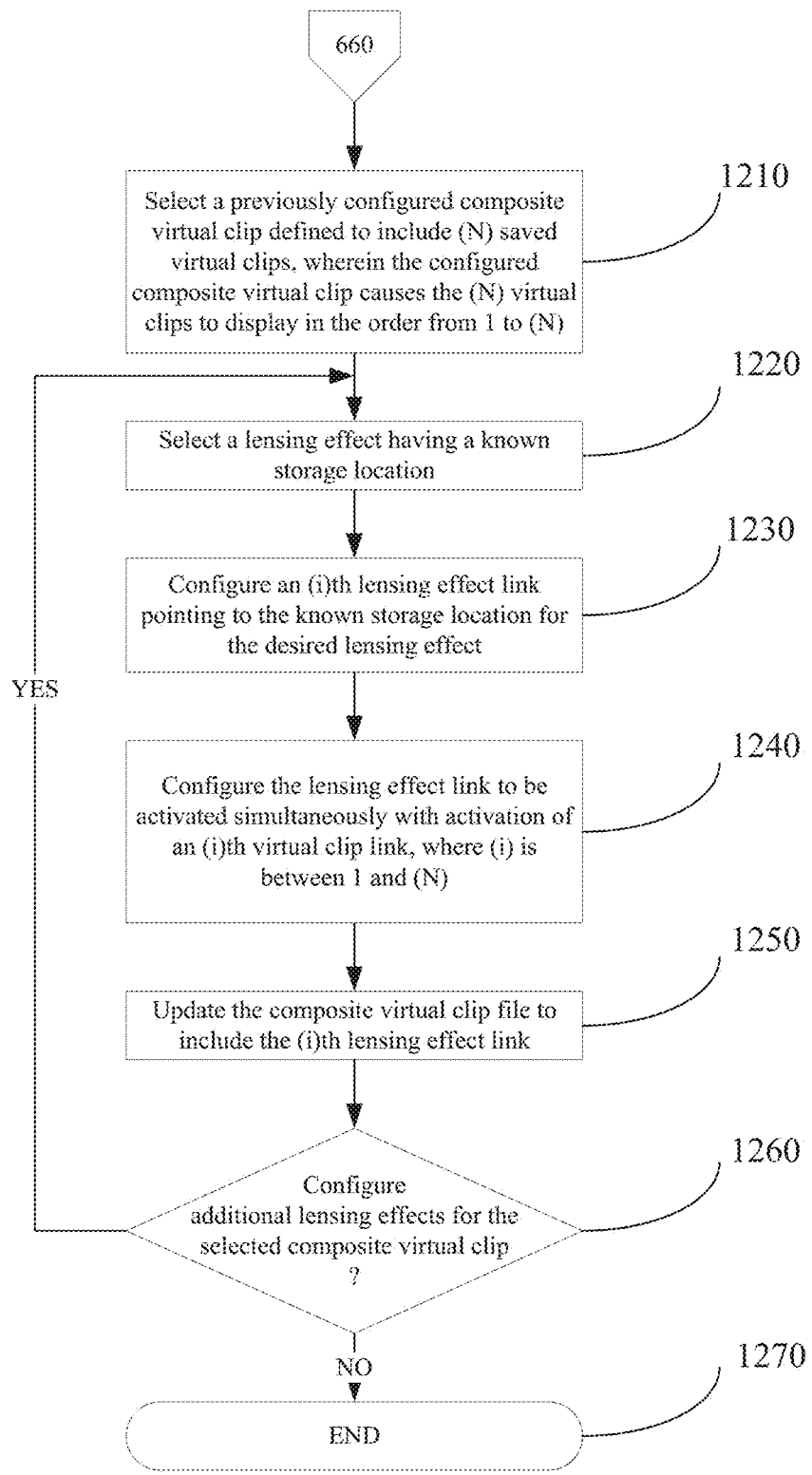
FIG. 10 summarizes steps in Applicants' method, steps implemented by Applicants' article of manufacture, and steps performed by a programmable processor implementing Applicants' computer program product.

Referring now to FIG. 10, in step 1210 the method selects a previously configured composite virtual clip, wherein that composite virtual clip is configured to include (N) previously saved virtual clips in an order from 1 to (N).

In step 1220, the method selects a lensing effect having a known storage location. In step 1230, the method configures an (i)th lensing effect link pointing to the known storage location for the desired lensing effect.

In step 1240, the method configures the (i)th lensing effect link to be simultaneously with activation of a link to an (i)th virtual clip. In step 1250, the method updates the composite virtual clip file to include the (i)th lensing effect link.

In step 1260, the method determines if the user desires to configure additional lensing effects for the selected composite virtual clip. If the user elects to configure additional transition effect links, then the method transition from step 1260 to step 1220 and continues as described herein. Alternatively, if the user does not elect to configure additional transition effect links, then the method transition from step 1260 to step 1270 and ends.

Figure 11:
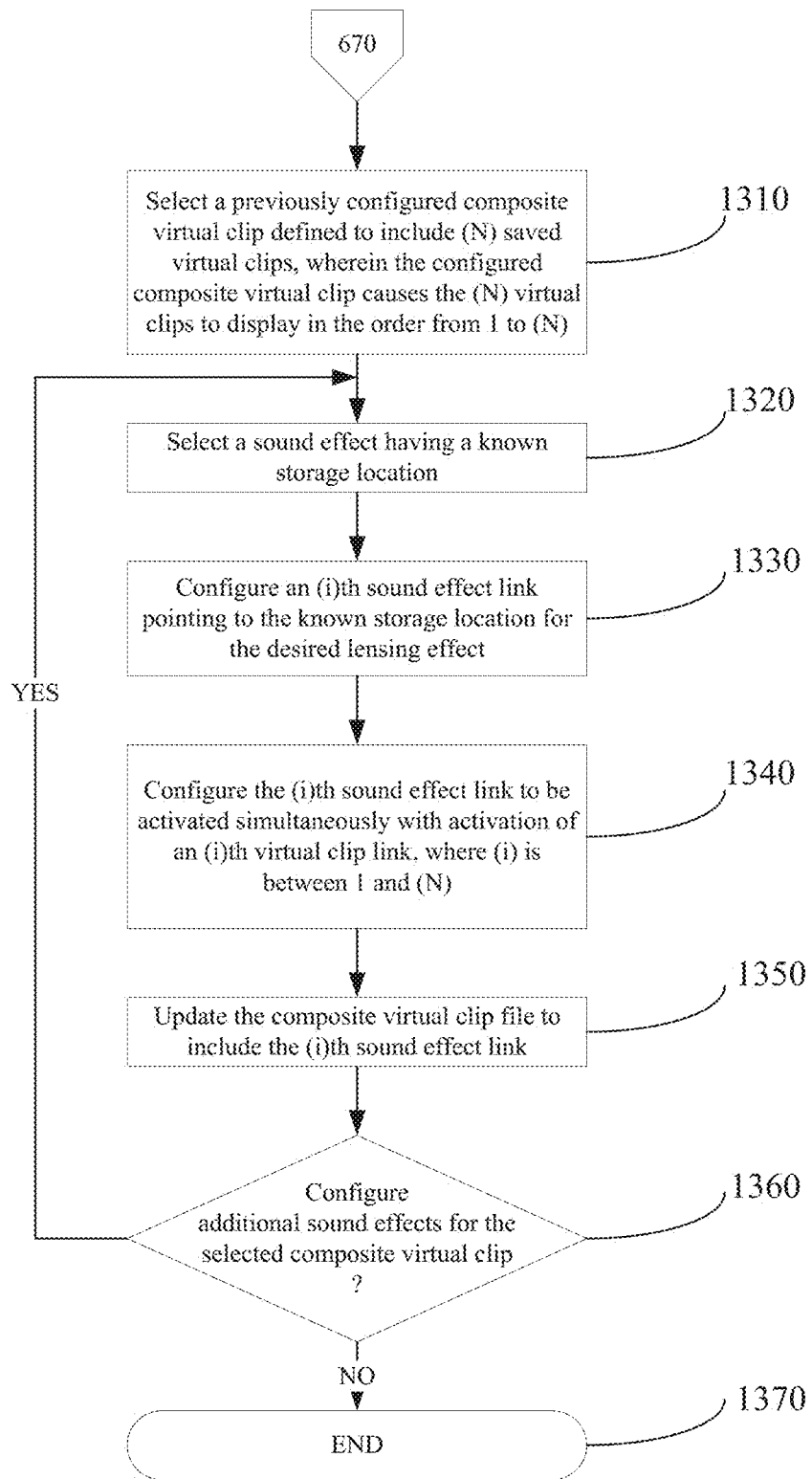
FIG. 11 summarizes steps in Applicants' method, steps implemented by Applicants' article of manufacture, and steps performed by a programmable processor implementing Applicants' computer program product.

If a user desires in step 670 to add one or more sound effects to a previously configured composite virtual clip, Applicants' method transitions from step 670 to step 1310 (FIG. 11). Referring now to FIG. 11, in step 1310 the method selects a previously configured composite virtual clip, wherein that composite virtual clip is configured to include (N) previously saved virtual clips in an order from 1 to (N).

In step 1320, the method selects a sound effect having a known storage location. In step 1330, the method configures an (i)th sound effect link pointing to the known storage location for the desired lensing effect.

In step 1340, the method configures the (i)th sound effect link to be simultaneously with activation of a link to an (i)th virtual clip. In step 1350, the method updates the composite virtual clip file to include the (i)th sound effect link.

In step 1360, the method determines if the user desires to configure additional sound effects for the selected composite virtual clip. If the user elects to configure additional sound effect links, then the method transition from step 1360 to step 1320 and continues as described herein. Alternatively, if the user does not elect to configure additional sound effect links, then the method transition from step 1360 to step 1370 and ends.

Figure 16:
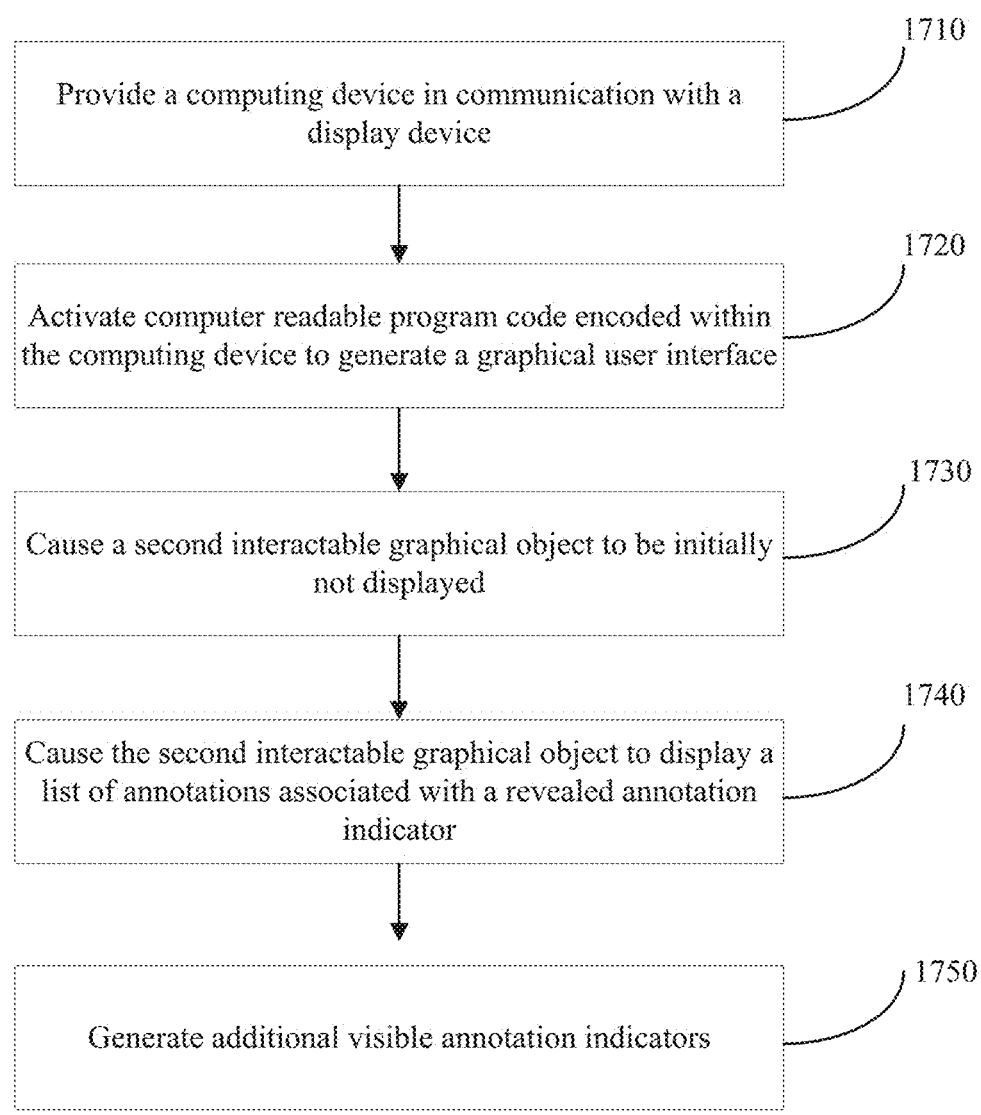
FIG. 16 is a flowchart of the method and/or process related to display annotations associated with a playable media file.

Referring to FIG. 16, a method for displaying annotations associated with a playable media file is disclosed. Either computing device 110 or 150 from the network 100 can be used to display annotations associated with a playable media file. In step 1720, the system may execute computer readable program code to generate a graphical user interface (GUI), such as the example GUI 1800 of FIG. 18A, and may cause the GUI 1800 to be displayed on a display device 107 (FIG. 1), such as by transmitting the GUI 1800 to the display device 107 or, when the system is implemented within the display device 107, by controlling a display of the display device 107 to display the GUI 1800. In certain embodiments, the graphical user interface 1800 may include a display window 1802 for displaying content encoded by the playable media file. The system may generate the GUI 1800 to include such playback (or other display) of the playable media file. In one embodiment, the system may obtain a virtual clip as described herein, and may determine a storage location of the playable media file from the virtual clip; then, the system may include, in the program instructions for displaying the GUI 1800, instructions that cause the display device 107 to access and/or retrieve the playable media file at the storage location. Additionally or alternatively, the system may itself access and/or retrieve the playable media file at the storage location, and may deliver the playable media file to the user's device for playback.

Figure 18A:
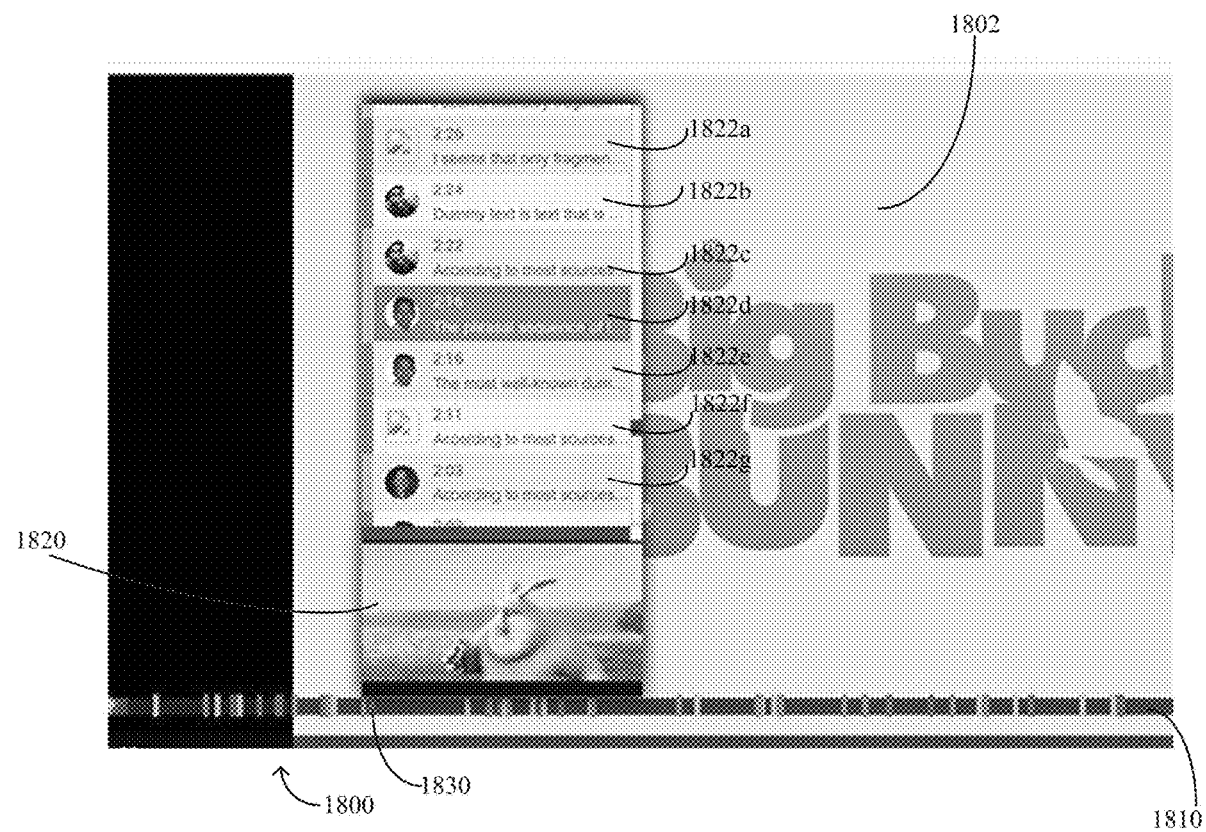
FIGS. 18A and 18B are examples of graphical user interfaces for displaying annotations.

Referring further to FIG. 18A, in some embodiments the GUI 1800 may include a first interactable graphical object 1810, which displays a timeline representing a duration of play of a playable media file. The first interactable graphical object 1810 may overlay the display window 1802 that displays the playable media file content. Further, the first interactable graphical object 1810 may display a plurality of visible annotation indicators. For example, a visible annotation indicator may be a clip indicator 1830 associated with a corresponding virtual clip that is associated with the playable media file. The clip indicator 1830 may identify a start time of the associated virtual clip, and may appear at the corresponding location along the timeline. In some embodiments, each virtual clip associated with the playable media file in a global data store may have a corresponding clip indicator 1830 appearing in the appropriate display position for the corresponding start time of the virtual clip. The clip indicator 1830 of each virtual clip may have a corresponding color that is selected based on an access type of the virtual clip with respect to the active user account. In the illustrated example, the colors of clip indicators 1830 are associated with: a public access type, wherein any user and non-user visitor can access the virtual clip; a shared access type, wherein another user of the social network has shared the virtual clip with the user of the active user account; and, a private access type, which are virtual clips created by the active user.

The GUI 1800 may further include a second interactable graphical object 1820 that also overlays a portion of the display window 1802. The second interactable graphical object 1820 may be configured to dynamically display up to a maximum number of graphic elements each associated with a corresponding virtual clip of the plurality of virtual clips; the graphic elements may be selected based on an interaction by the user with a certain display position on the timeline. In some embodiments, when the system receives a user input indicating that the user interacted with (e.g., clicked or tapped on, or hovered over with a mouse pointer) the timeline at a first display position, the system may create each of the graphic elements to include information related to a virtual clip that has a start time within a certain duration from the time associated with the first display position. For example, based on the time within the playable media file that corresponds to the first display position, the system may identify one, some, or all of the virtual clips as displayable virtual clips: the virtual clip having its start time closest to the time at the first display position may be selected as a first clip; then, one or more virtual clips preceding (e.g., sequentially preceding) the first clip and/or one or more virtual clips subsequent (e.g., sequentially subsequent) may be selected, such that a number of virtual clips no greater than the maximum number of graphic elements are selected. Then, in order of their start times, the displayable virtual clips are each associated with one of the graphic elements, such that information about the clip is displayed in the graphic element when the second interactable graphical object 1820 is visible in the GUI 1800. For example, the graphic elements may be displayed in a stacked list, as illustrated, with the first clip approximate the vertical center of the list. The system may revise the selection of displayable virtual clips and update the GUI 1800 accordingly each time a new user input indicates another interaction with the timeline.

The second interactable graphical object 1820 may have a setting that the system can switch to make the second interactable graphical object 1820 visible or not visible within the GUI 1800. In one embodiment, the system causes the second interactable graphical object 1820 not to be displayed when the GUI 1800 is first displayed. Then (e.g., in step 1740 of FIG. 16), when a user interacts with a visible annotation indicator 1830, or any other part of the first interactable graphical object 1810, the system update the GUI 1800 to display the second interactable graphical object 1820, itself displaying the list of graphical elements (e.g., annotations 1822*a-g*). Additionally, in step 1750, the system may create additional annotation indicators, which are displayed on the first interactable graphical object 1810, based on a user's input. The data profile 300 in FIG. 3 further comprises an access type indication whether an annotation is a public annotation available to all network users of a social network, a shared annotation made accessible to a user by one of the network users, or a private annotation accessible only by a user; and an identifier of a creating user of an annotation.

Figure 18B:
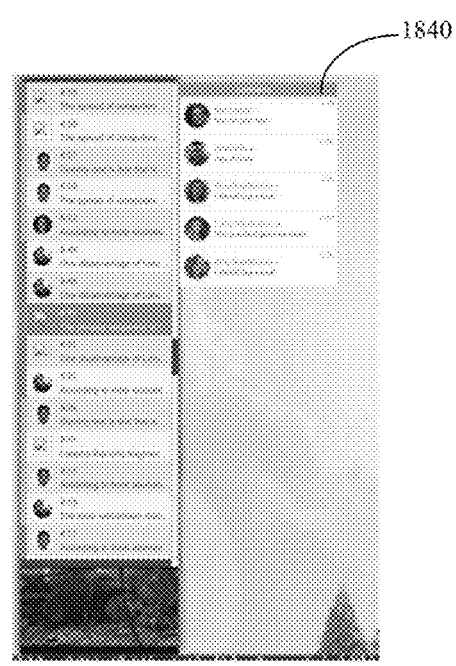

Referring to FIG. 18B, the graphical user interface 1800 may further include a third interactable graphical object 1840 overlaying a third portion of the display window. When a user interacts with an annotation displayed on the second interactable graphical object 1820, the third interactable graphical object 1840 could be made visible by the system, as described above. For example, while the GUI 1800 is displaying information for a first virtual clip in a first graphic element of the second interactable graphical object 1810, the system may receive a user input indicative of a user interaction with the first graphic element. In response, the system may obtain entries in a discussion thread associated with the first clip, and may render information from the discussion thread into the third interactable graphical object 1840 and update the GUI 1800 to display the third interactable graphical object 1840.

For the purpose of this application, a machine learning engine can learn what a user of a network behavior looks like and the machine learning engine can interact with the computing device and the control device within the network 100.

While the preferred embodiments of the present invention have been illustrated in detail, it should be apparent that modifications and adaptations to those embodiments may occur to one skilled in the art without departing from the scope of the present invention.

We claim:

1. A method for displaying information associated with a Playable Media File, comprising:

obtaining stored data describing the information, the stored data comprising a storage location of the playable media file and a plurality of virtual clips each associated with the playable media file and including a first data element identifying a first time within the playable media file at which a corresponding virtual clip begins, and a second data element identifying a first user profile associated with creating the corresponding virtual clip;

accessing the playable media file at the storage location;

causing a graphical user interface (GUI) to be displayed on a computing device of a user, wherein said GUI enables the user to generate user inputs by interacting with the GUI, and the GUI comprises:

a display window for displaying content encoded by the playable media file;

a first interactable graphical object, wherein the first interactable graphical object overlays a first portion of the display window and displays a timeline representing a duration of the playable media file and a plurality of clip indicators each associated with a corresponding virtual clip of the plurality of virtual clips, each clip indicator appearing on the timeline at a display position corresponding to the first time identified by the first data element of the corresponding virtual clip; and a second interactable graphical object, wherein the second interactable graphical object overlays a second portion of the display window, is configured to display up to a first number of graphic elements each associated with a corresponding virtual clip of the plurality of virtual clips, and is initially not displayed in the GUI;

receiving a first user input indicating a first interaction of the user with a first display position on the timeline;

determining a selected time within the playable media file that corresponds to the first display position;

identifying, as a plurality of displayable virtual clips:

a first virtual clip of the plurality of virtual clips, the corresponding first time of the first virtual clip being the closest, of the plurality of virtual clips, to the selected time; and one or more of the virtual clips wherein the corresponding first time precedes and is approximate to the first time of the first virtual clip, and one or more of the virtual clips wherein the corresponding first time is subsequent and approximate to the first time of the first virtual clip, such that at most the first number of the plurality of virtual clips are selected as the plurality of displayable virtual clips; and updating the user interface on the computing device to display a list of the plurality of displayable virtual clips in the second interactable graphical object.

2. The method of claim 1, wherein each of the plurality of virtual clips further comprises a first access type indicating whether the virtual clip is a public clip available to any requesting user, a shared clip made accessible to the user by one of a plurality of network users of a web service, or a private clip accessible only by the user, and wherein causing the user interface to be displayed on the computing device comprises determining, for each of the plurality of clip indicators, a display color based on the first access type of the corresponding virtual clip.

3. The method of claim 2, further comprising:

receiving a second user input;

creating, from the second user input, an annotation associated with a first displayable virtual clip of the plurality of displayable virtual clips;

providing said annotation to a network server;

providing a data profile to said network server, wherein said data profile comprises a location in said Playable Media File where said annotation should be made visible;

determining by said network server if said annotation is a first annotation submitted for said Playable media File;

if said annotation is not a first annotation submitted for said Playable Media File, encoding said data profile in a previously-created table of contents for said Playable Media File;

if said annotation is a first annotation submitted for said Playable Media File:
creating a table of contents by said network server for said Playable Media File; and
encoding by said network server said data profile in said table of contents.

4. The method of claim 3, wherein the data profile further comprises:
a second access type indicating whether the corresponding annotation is a public annotation to all network users of a social network, a shared annotation made accessible to the user by one of the network users, or a private annotation accessible only by the user; and
an identifier of a creating user of the corresponding annotation.

5. The method of claim 1, wherein the graphical user interface further comprises a third interactable graphical object overlaying a third portion of the display window, having a visible state controlling whether the third interactable graphical object is visible or hidden, and when visible displaying a discussion thread comprising annotations associated with a selected virtual clip of the plurality of displayable virtual clips.

6. The method of claim 5, further comprising:
receiving a second user input describing an interaction with the selected virtual clip within the second interactable graphical object; and
responsive to the second user input, displaying the discussion thread within the third interactable graphical object.

7. The method of claim 1, wherein obtaining the stored data comprises:
causing a recording device to begin capturing, as the playable media file, a recording of live content;
while the recording device is capturing the live content, receiving a second user input at a first time, the recording device continuing to capture the live content subsequent to the second user input;
while the recording device is capturing the live content, receiving on the user interface a third user input at a second time; and
creating a first virtual clip of the plurality of virtual clips, the first virtual clip having the first time as the corresponding first position and the second time as the corresponding second position.

8. The method of claim 1, further comprising:
receiving a second user input associated with a first virtual clip of the plurality of virtual clips;
determining that the second user input comprises a character string in a predetermined format comprising:
a tag identifier indicating that the user input includes one or more taxonomy tags;
a first tag following the tag identifier; and
one or more subtags sequentially following the first tag and delimited by a delimiter character;
identifying one or more taxonomy tags from the second user input; and
associating, in the stored data, the first virtual clip with the one or more taxonomy tags to produce a searchable virtual clip that is delivered to a requesting device in response to a query from the requesting device for any of the plurality of virtual clips that are associated with the user profile and the one or more taxonomy tags.

9. The method of claim 8, wherein associating the first virtual clip with the one or more taxonomy tags comprises creating, based on an order in the second user input of the one or more taxonomy tags, a directed relationship between a first taxonomy tag and a second taxonomy tag sequentially following the first taxonomy tag in the character string, the directed relationship enabling a user to retrieve the first virtual clip from the stored data using an ordered combination of the first and second taxonomy tags as the query.

10. A method of annotating a playable media file, the method comprising:
obtaining a virtual clip comprising a first location within the playable media file and a second location within the playable media file, the first and second locations together defining a clip of the playable media file occurring between the first and second locations;
causing, using the virtual clip, the clip to be displayed on a computing device of a user;
receiving a first user input associated with the virtual clip;
determining that the first user input conforms to a predetermined format defining taxonomy tags;
identifying one or more taxonomy tags from the user input, wherein identifying the one or more taxonomy tags comprises determining the one or more taxonomy tags using the predetermined format comprising:
a tag identifier indicating that the user input includes taxonomy tags; and
one or more tags following the tag identifier and separated from each other by a delimiter, the one or more tags including a first tag and zero or more subtags arranged in sequence; and
associating, in an account of the user, the virtual clip with each of the one or more taxonomy tags identified from the user input.

11. The method of claim 10, wherein associating the virtual clip with the one or more taxonomy tags comprises arranging the one or more taxonomy tags according to the sequence in the user input of the one or more taxonomy tags.

12. The method of claim 11, wherein the virtual clip is associated with each of the one or more taxonomy tags in a global data store tracking use of the taxonomy tags by all network users of a social network, and wherein the first user input includes a first taxonomy tag following the tag identifier, a second taxonomy tag following the first taxonomy tag, and a third taxonomy tag following the second taxonomy tag, the method further comprising:
causing the first user input to be displayed in association with an interactable graphical object on the computing device;
receiving a second user input indicating a selection of the second taxonomy tag in the first user input;
determining, as a tag filter, a portion of the sequence including the first taxonomy tag and the second taxonomy tag;
querying the global data store to obtain a plurality of filtered virtual clips each associated with the first taxonomy tag and the second taxonomy tag according to the tag filter; and
causing the plurality of filtered virtual clips to be displayed on the computing device.

13. The method of claim 12, wherein associating the virtual clip with the one or more taxonomy tags further comprises associating the virtual clip in the global data store with a user identifier of a creating user of the virtual clip, and wherein the tag filter further includes the user identifier, such that the plurality of filtered virtual clips are each associated with the user identifier.

\* \* \* \* \*